(12) United States Patent
Chae et al.

(10) Patent No.: US 11,360,285 B2
(45) Date of Patent: Jun. 14, 2022

(54) OPTICAL IMAGING SYSTEM AND CAMERA MODULE

(71) Applicant: Samsung Electro-Mechanics Co., Ltd., Suwon-si (KR)

(72) Inventors: Kyu Min Chae, Suwon-si (KR); Eun Chong Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 141 days.

(21) Appl. No.: 16/371,244

(22) Filed: Apr. 1, 2019

(65) Prior Publication Data

US 2020/0103615 A1 Apr. 2, 2020

(30) Foreign Application Priority Data

Sep. 28, 2018 (KR) .................. 10-2018-0116288

(51) Int. Cl.
*G02B 7/02* (2021.01)
*G02B 9/62* (2006.01)
*G02B 13/18* (2006.01)

(52) U.S. Cl.
CPC ............. *G02B 7/028* (2013.01); *G02B 7/021* (2013.01); *G02B 9/62* (2013.01); *G02B 13/18* (2013.01)

(58) Field of Classification Search
CPC .... G02B 13/00; G02B 13/04; G02B 13/0045; G02B 13/06; G02B 13/18; G02B 9/62; G02B 7/02; G02B 7/021; G02B 7/028; G02B 21/02; G02B 15/177; G02B 3/04
USPC ........ 359/713, 740, 658, 752, 755, 756, 762
See application file for complete search history.

(56) References Cited

U.S. PATENT DOCUMENTS

| 7,595,938 B2 | 9/2009 | Yamakawa et al. |
| 8,248,715 B2 * | 8/2012 | Asami ............... G02B 13/04 359/762 |
| 8,902,516 B2 * | 12/2014 | Asami ............... G02B 13/06 359/762 |
| 2017/0276895 A1 | 9/2017 | Sakuma et al. |
| 2018/0172960 A1 | 6/2018 | Park et al. |
| 2018/0180852 A1 | 6/2018 | Jung |

FOREIGN PATENT DOCUMENTS

| CN | 106842481 A | 6/2017 |
| CN | 206311832 U | 7/2017 |
| CN | 207074300 U | 3/2018 |
| CN | 108227157 A | 6/2018 |
| JP | 2015-190999 A | 11/2015 |

(Continued)

OTHER PUBLICATIONS

English translation of JP 2015190999, machine translated on Oct. 14, 2021. (Year: 2015).*

(Continued)

*Primary Examiner* — Jie Lei
(74) *Attorney, Agent, or Firm* — NSIP Law

(57) ABSTRACT

An optical imaging system including a first lens, a second lens, a third lens, a fourth lens, a fifth lens, and a sixth lens disposed in order from an object side, wherein one or more of the first to sixth lenses is disposed between a stop and an imaging plane and of those, one or more has positive refractive power and one is made of a glass material, and four or more of the first to sixth lenses are made of a plastic material.

20 Claims, 16 Drawing Sheets

(56) References Cited

FOREIGN PATENT DOCUMENTS

KR  10-2017-0058601 A  5/2017
KR  10-2018-0072355 A  6/2018

OTHER PUBLICATIONS

Chinese Office Action dated Apr. 1, 2021, in counterpart Chinese Patent Application No. 201910562181.X (8 pages in English and 8 pages in Chinese).
Chinese Office Action dated Jul. 22, 2021, in counterpart Chinese Patent Application No. 201910562181.X (10 pages in English and 9 pages in Chinese).

\* cited by examiner

OPTICAL IMAGING SYSTEM AND CAMERA MODULE

CROSS-REFERENCE TO RELATED APPLICATIONS

This application claims the benefit under 35 U.S.C. 119(a) of Korean Patent Application No. 10-2018-0116288 filed on Sep. 28, 2018, in the Korean Intellectual Property Office, the entire disclosure of which is incorporated herein by reference for all purposes.

BACKGROUND

1. Field

This application relates to an optical imaging system and camera module capable of implementing constant optical performance irrespective of changes in ambient temperature.

2. Description of the Background

Generally, surveillance cameras provided in vehicles have been used to image only shapes of surrounding objects, and it has not been necessary to design surveillance cameras to provide high resolution images. However, as a self-driving function has recently been provided in vehicles, there has been demand for an optical system appropriate for a camera which can image objects at a long distance or can provide clearer images of objects at a short distance.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens disposed in order from an object side, wherein one or more of the lenses are disposed between a stop and an imaging plane one of which is made of a glass material, four or more of the lenses are made of a plastic material, and the optical imaging system satisfies a conditional expression: Gf/f<3.5, where f is a focal length of the optical imaging system, and Gf is a focal length of the lens made of a glass material and disposed between the stop and the imaging plane.

The first lens may have negative refractive power.
The second lens may have negative refractive power.
The third lens may have positive refractive power.
The fourth lens may have positive refractive power.
Both surfaces of the fifth lens may be concave or convex.
The first lens may have a convex object-side surface.
The first lens may have a concave image-side surface.
The fourth lens may have a convex image-side surface.
The sixth lens may have a convex image-side surface.
Two of the lenses may be made of a glass material.
A camera module may include the optical imaging system disposed in a lens barrel having a first linear coefficient of thermal expansion, and a housing having a second linear coefficient of thermal expansion accommodating the lens barrel, and comprising the imaging plane spaced apart from the lens barrel.

In another general aspect, an optical imaging system includes a first lens, a second lens, a third lens, a fourth lens, a fifth lens, and a sixth lens disposed in order from an object side, wherein one or more of the first to sixth lenses is disposed between a stop and an imaging plane and of those, one or more comprises positive refractive power and one is made of a glass material, and four or more of the first to sixth lenses are made of a plastic material.

The stop may be disposed between the third lens and the fourth lens.
The fourth lens may be made of a glass material.
The first lens and the sixth lens may be made of a glass material.
The second lens and the third lens may be made of a plastic material.

In another general aspect, a camera module includes a housing having a first linear coefficient of thermal expansion, and including an imaging plane, and a lens barrel having a second linear coefficient of thermal expansion disposed in the housing and including an optical imaging system to focus incident light on the imaging plane, the optical imaging system including a first lens, a second lens, a third lens, a fourth lens, a fifth lens, and a sixth lens disposed in order from an object side in the lens barrel, wherein one or two of the lenses are made of a glass material and four or five are made of a plastic material, and one of the lenses made of a glass material is disposed between a stop of the optical imaging system and the imaging plane of the housing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
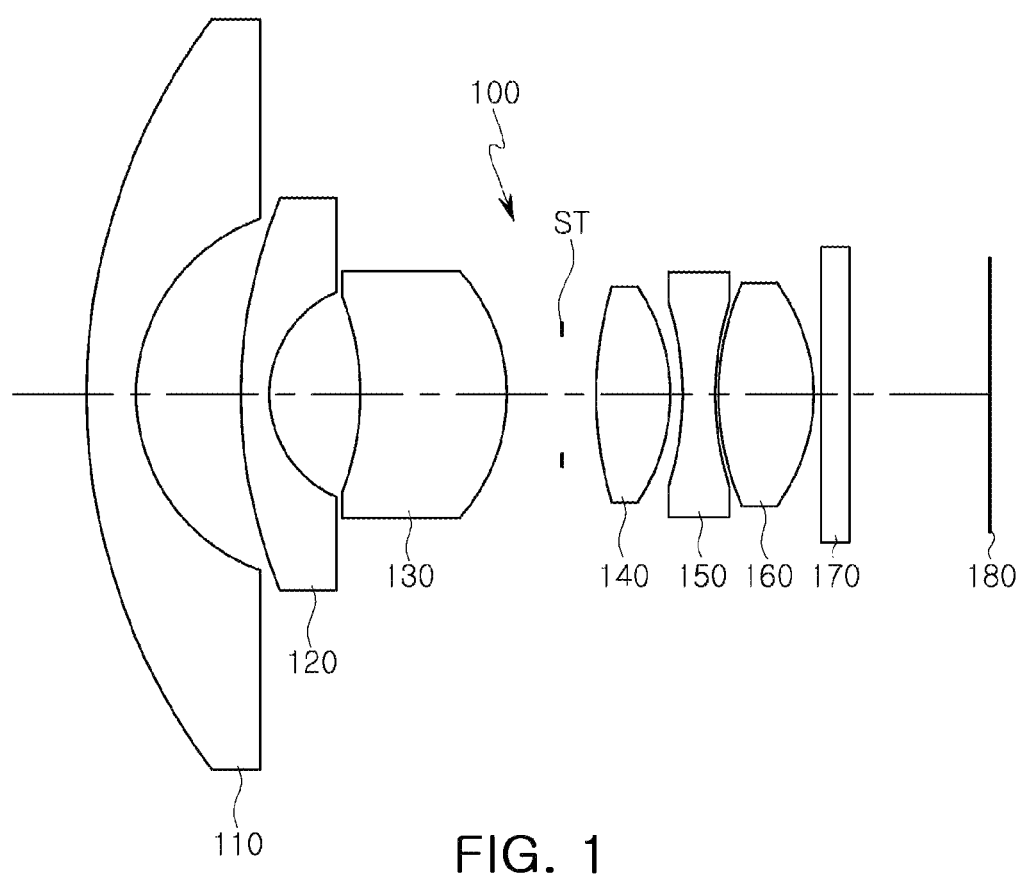
FIG. 1 is a diagram illustrating a first example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

In the examples described herein, an entirety of a radius of curvature, a thickness, and a focal length of a lens are indicated in millimeters (mm). Further, a thickness of a lens, and a gap between lenses are distances measured based on an optical axis of the lens.

In a description of a form of a lens, a surface of a lens being convex indicates that an optical axis region of a corresponding surface is convex, while a surface of a lens being concave indicates that an optical axis region of a corresponding surface is concave. Therefore, in a configuration in which a surface of a lens is described as being convex, an edge region of the lens may be concave. In a similar manner, in a configuration in which a surface of a lens is described as being concave, an edge region of the lens may be convex.

An aspect of the present disclosure is to provide a high-resolution optical imaging system and a camera module configured to have a constant level of optical performance of the optical imaging system over a broad range of temperatures irrespective of temperature change.

In the examples described herein, an optical imaging system may include a plurality of lenses. For example, the optical imaging system may include six lenses. In the descriptions below, the lenses of the optical imaging system will be described.

The first lens may have refractive power. For example, the first lens may have negative refractive power.

The first lens may have a convex surface. For example, the first lens may have a convex object-side surface.

The first lens may have a spherical surface. For example, both surfaces of the first lens may be spherical. The first lens may be made of a material having a constant refractive index irrespective of temperature change. For example, the first lens may be made of a glass material. However, a material of the first lens is not limited thereto.

The first lens may have a certain refractive index. For example, a refractive index of the first lens may be 1.7 or higher. When the first lens is made of a plastic material, however, a refractive index of the first lens may be less than 1.7. The first lens may have an Abbe number smaller than an Abbe number of the second lens. When the first lens is made of a plastic material, however, an Abbe number of the first lens may be approximately similar to an Abbe number of the second lens.

The second lens may have refractive power. For example, the second lens may have negative refractive power.

The second lens may have a concave surface. For example, the second lens may have a concave image-side surface.

The second lens may include an aspherical surface. For example, both surfaces of the second lens may be aspherical. The second lens may be made of a material having high light transmissivity and excellent workability. For example, the second lens may be made of a plastic material.

The second lens may have a certain refractive index. For example, a refractive index of the second lens may be less than 1.6. The second lens may have a certain Abbe number. For example, an Abbe number of the second lens may be 60 or less.

The third lens may have refractive power. For example, the third lens may have positive refractive power.

The third lens may have a convex surface. For example, the third lens may have a convex object-side surface or a convex image-side surface.

The third lens may have an aspherical surface. For example, at least one of the object-side surface and the image-side surface of the third lens may be aspherical. The third lens may be made of a material having high light transmissivity and excellent workability. For example, the third lens may be made of a plastic material.

The third lens may have a certain refractive index. For example, a refractive index of the third lens may be greater than 1.6. The third lens may have a certain Abbe number. For example, an Abbe number of the third lens may be 30 or less.

The fourth lens may have refractive power. For example, the fourth lens may have positive refractive power.

The fourth lens may have a convex surface. For example, the fourth lens may have a convex image-side surface.

The fourth lens may include a spherical surface. For example, both surfaces of the fourth lens may be spherical. The fourth lens may be made of a material having a constant refractive index irrespective of temperature change. For example, the fourth lens may be made of a glass material. However, a material of the fourth lens is not limited thereto. When the fifth lens or the sixth lens are made of a glass material, however, the fourth lens may be made of a plastic material.

The fourth lens may have a certain refractive index. For example, a refractive index of the fourth lens may be 1.5 or higher. The fourth lens may have an Abbe number higher than an Abbe number of the third lens. For example, an Abbe number of the fourth lens may be 40 or higher.

The fifth lens may have refractive power. For example, the fifth lens may have positive refractive power or negative refractive power.

Both surfaces of the fifth lens may have the same shape. For example, both surfaces of the fifth lens may be convex or concave.

The fifth lens may be made of a material having high light transmissivity and excellent workability. For example, the fifth lens may be made of a plastic material. However, a material of the fifth lens may not be limited to a plastic material. For example, when the fourth lens and the sixth lens are made of a plastic material, the fifth lens may be made of a glass material.

The fifth lens may have a certain refractive index. For example, a refractive index of the fifth lens may be 1.5 or higher.

The sixth lens may have refractive power. For example, the sixth lens may have positive refractive power or negative refractive power.

The sixth lens may have a convex surface. For example, the sixth lens may have a convex image-side surface.

The sixth lens may be made of a material having high light transmissivity and excellent workability. For example, the sixth lens may be made of a plastic material. However, a material of the sixth lens is not limited thereto. For example, when the fourth lens and the fifth lens are made of a plastic material, the sixth lens may be made of a glass material.

The sixth lens may have a certain refractive index. For example, a refractive index of the sixth lens may be 1.5 or higher.

The optical imaging system may include one or more aspherical lenses. For example, three or more of the first to sixth lenses may include aspherical surfaces. For example, a lens disposed most adjacent to an object side or an imaging plane, and a lens adjacent to a stop may include aspherical surfaces. The optical imaging system satisfying the conditions above may be desirable to implement a high resolution and to improve aberration. The aspherical surface may be represented by Equation 1 below.

$$Z = \frac{cr^2}{1+\sqrt{1-(1+k)c^2r^2}} + Ar^4 +$$
$$Br^6 + Cr^8 + Dr^{10} + Er^{12} + Fr^{14} + Gr^{16} + Hr^{18}$$

In Equation 1, "c" is an inverse of a radius of curvature of a respective lens, "k" is a conic constant, "r" is a distance from a certain portion on an aspherical surface of the lens to an optical axis, "A" to "H" are aspheric constants, "Z" (or SAG) is a height from a certain point on an aspherical surface of the lens to an apex of the aspherical surface in an optical axis direction.

The optical imaging system may include an image sensor. The image sensor may be configured to implement a high level of resolution. A surface of the image sensor may form an imaging plane on which a subject is imaged.

The optical imaging system may include a stop. The stop may be disposed between lenses. For example, the stop may be disposed between the third lens and the fourth lens. The stop disposed as above may adjust the amount of light incident to an image sensor.

The optical imaging system may include a filter. The filter may be disposed between the sixth lens and the image sensor and may remove elements which may degrade resolution. For example, the filter may block light of infrared wavelengths.

The optical imaging system may be configured to significantly reduce changes in focal length caused by temperature. For example, at least four lenses among the first to sixth lenses may be made of a plastic material, and the other lenses may be made of a glass material. One of the lenses made of a glass material may be disposed between the stop and the imaging plane, and may have positive refractive power. The optical imaging system satisfying the conditions above may have constant optical characteristics over a range of temperatures, in relatively high temperature or in relatively low temperature, and manufacturing costs and a weight of the optical imaging system may be reduced.

The optical imaging system may satisfy conditional expressions below:

$Gf/f < 3.5$ (conditional expression 1)

$8.0 < TL/f < 14$ (conditional expression 2)

In the conditional expressions above, "f" is a total focal length of the optical imaging system, "Gf" is a focal length of the lens made of a glass material and disposed between a stop and an imaging plane, and "TL" is a distance from an object-side surface of the first lens to the imaging plane.

The optical imaging system configured as above may have a constant resolution in relatively high temperature or in relatively low temperature. Thus, the optical imaging system in the examples described herein may provide clear images even when the optical imaging system is installed in a place easily exposed to an external environment such as front and rear bumpers of vehicles. Further, the optical imaging system may implement a relatively wide field of view of 180° or greater.

In the description below, an optical imaging system will be described in accordance with example embodiments.

A first example embodiment of an optical imaging system will be described with reference to FIG. 1.

The optical imaging system 100 may include a plurality of lenses having refractive power. For example, the optical imaging system 100 may include a first lens 110, a second lens 120, a third lens 130, a fourth lens 140, a fifth lens 150, and a sixth lens 160.

The first lens 110 may have negative refractive power, and may have a convex object-side surface and a concave image-side surface. The second lens 120 may have negative refractive power, and may have a convex object-side surface and a concave image-side surface. The third lens 130 may have positive refractive power, and may have a concave object-side surface and a convex image-side surface. The fourth lens 140 may have positive refractive power, and may have a convex object-side surface and a convex image-side surface. The fifth lens 150 may have negative refractive power, and may have a concave object-side surface and a concave image-side surface. The sixth lens 160 may have positive refractive power, and may have a convex object-side surface and a convex image-side surface.

The optical imaging system 100 may include a plurality of aspherical lenses. The optical imaging system 100 may include a lens made of a glass material to exhibit constant optical performance even when temperature changes due to external conditions. In the present example, the first lens 110 and the fourth lens 140 may be made of a glass material, and the other lenses may be made of a plastic material.

The optical imaging system 100 may include a stop ST. The stop ST may be disposed between the third lens 130 and the fourth lens 140. The optical imaging system 100 may include a filter 170. The filter 170 may be disposed between the sixth lens 160 and an imaging plane 180. The filter 170 may block infrared light, and may prevent contamination of the imaging plane caused by foreign objects.

In the optical imaging system 100, TL is 13.51 mm, f is 1.137 mm, TL/f is 11.879, and Gf/f is 2.838, for example.

Figure 2:
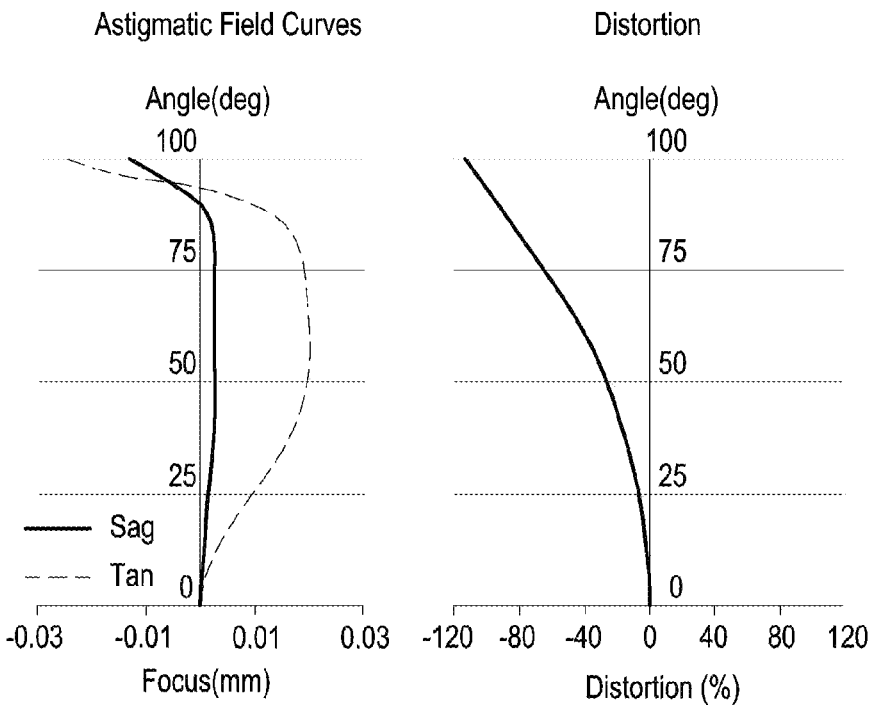
FIG. 2 are example aberration curves of an optical imaging system illustrated in FIG. 1.
Figure 3:
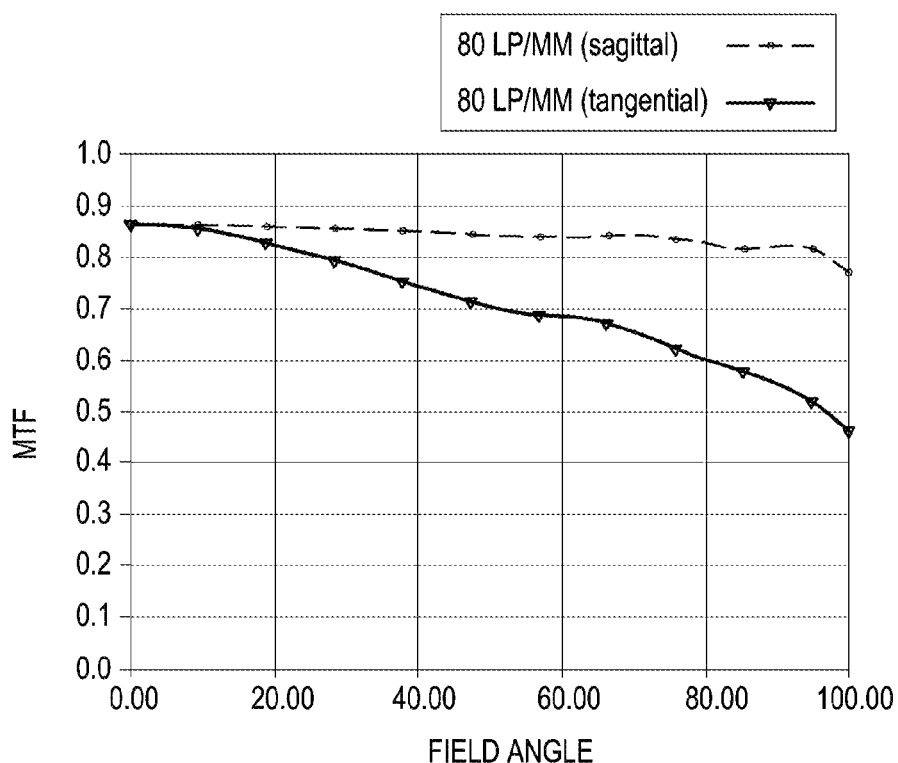
FIG. 3 are example modulation transfer function (MTF) curves of an optical imaging system illustrated in FIG. 1 depending on temperature change.

Table 1 lists characteristics of the lenses, and Table 2 lists aspheric coefficients of the lenses. FIG. 2 shows example aberration curves of the optical imaging system, and FIG. 3 shows example MTF curves of the optical imaging system of the present example.

TABLE 1

| Surface No. | Note | Radius of Curvature | Thickness/ Distance | Refractive Index | Abbe No. | Focal Length |
|---|---|---|---|---|---|---|
| S1 | First | 9.570 | 0.750 | 1.7725 | 49.62 | −5.33 |
| S2 | Lens | 2.781 | 1.554 | | | |
| S3 | Second | 16.822 | 0.417 | 1.5348 | 55.71 | −3.706 |
| S4 | Lens | 1.758 | 1.376 | | | |
| S5 | Third | −6.329 | 2.200 | 1.6142 | 25.59 | 5.882 |
| S6 | Lens | −2.604 | 0.816 | | | |
| S7 | Stop | Infinity | 0.515 | | | |
| S8 | Fourth | 5.806 | 1.126 | 1.6201 | 63.48 | 3.226 |
| S9 | Lens | −2.826 | 0.194 | | | |
| S10 | Fifth | −3.637 | 0.400 | 1.6612 | 20.35 | −2.528 |
| S11 | Lens | 3.229 | 0.110 | | | |
| S12 | Sixth | 2.702 | 1.439 | 1.5441 | 56.09 | 2.742 |
| S13 | Lens | −2.707 | 0.100 | | | |
| S14 | Filter | Infinity | 0.400 | 1.5168 | 64.17 | |
| S15 | | Infinity | 2.109 | | | |
| S16 | Imaging Plane | Infinity | 0.000 | | | |

TABLE 2

| Surface No. | K | A | B | C | D |
|---|---|---|---|---|---|
| S3 | 0 | 0.007776 | −0.00031 | −1.7E−05 | — |
| S4 | 0 | 0.008257 | 0.000568 | 0.000965 | — |
| S5 | 0 | −0.01791 | −0.0007 | — | — |

TABLE 2-continued

| Surface No. | K | A | B | C | D |
|---|---|---|---|---|---|
| S6 | 0 | 0.004021 | 0.000687 | — | — |
| S10 | 0 | 0.02334 | −0.02677 | 0.005554 | 0.0004 |
| S11 | 0 | −0.0048 | −0.00216 | 0.000051 | — |

Figure 4:
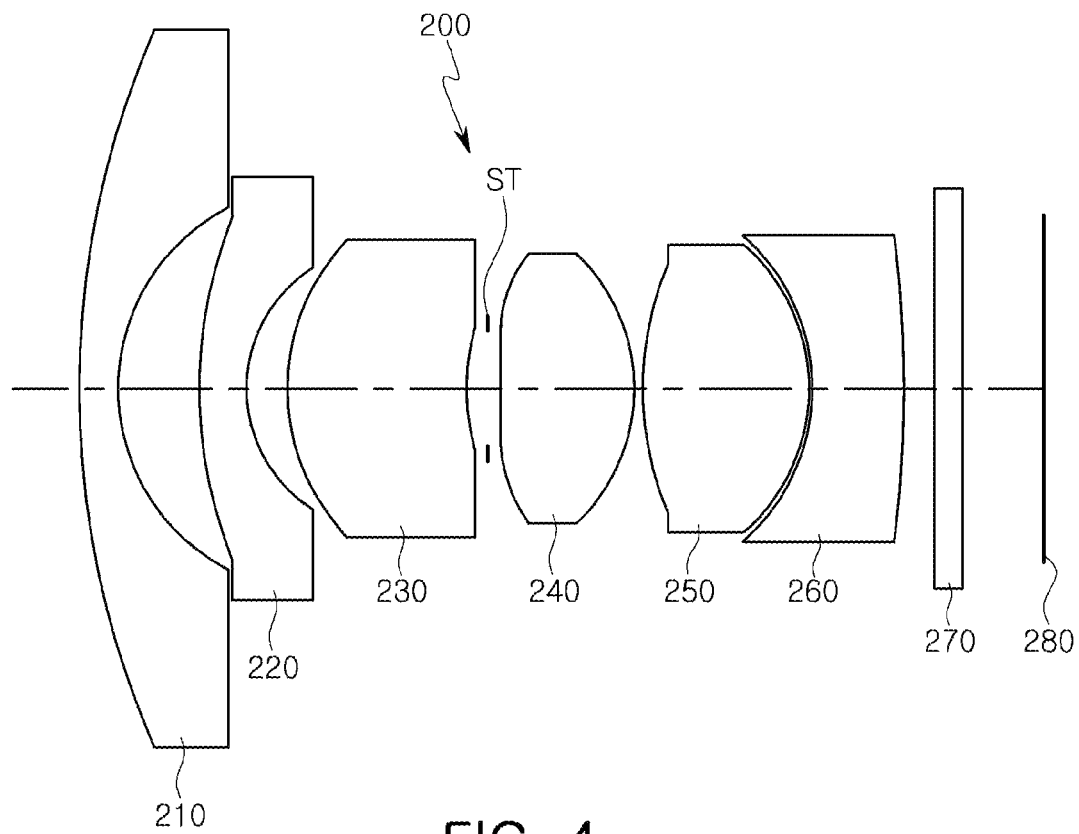
FIG. 4 is a diagram illustrating a second example of an optical imaging system.

In the description below, a second example of an optical imaging system will be described with reference to FIG. 4.

An optical imaging system 200 may include a plurality of lenses having refractive power. For example, the optical imaging system 200 may include a first lens 210, a second lens 220, a third lens 230, a fourth lens 240, a fifth lens 250, and a sixth lens 260.

The first lens 210 may have negative refractive power, and may have a convex object-side surface and a concave image-side surface. The second lens 220 may have negative refractive power, and may have a convex object-side surface and a concave image-side surface. The third lens 230 may have positive refractive power, and may have a convex object-side surface and a concave image-side surface. The fourth lens 240 may have positive refractive power, and may have a convex object-side surface and a convex image-side surface. The fifth lens 250 may have positive refractive power, and may have a convex object-side surface and a convex image-side surface. The sixth lens 260 may have negative refractive power, and may have a concave object-side surface and a convex image-side surface.

The optical imaging system 200 may include a plurality of aspherical lenses. The optical imaging system 200 may include a lens made of a glass material to exhibit constant optical performance even when temperature changes due to external conditions. In the present example, the first lens 210 and the fourth lens 240 may be made of a glass material, and the other lenses may be made of a plastic material.

The optical imaging system 200 may include a stop ST. The stop ST may be disposed between the third lens 230 and the fourth lens 240. The optical imaging system 200 may include a filter 270. The filter 270 may be disposed between the sixth lens 260 and an imaging plane 280. The filter 270 may block infrared light, and may prevent contamination of the imaging plane caused by foreign objects.

In the optical imaging system 200, TL is 15.01 mm, f is 1.703 mm, TL/f is 8.8121, and Gf/f is 2.445, for example.

Figure 5:
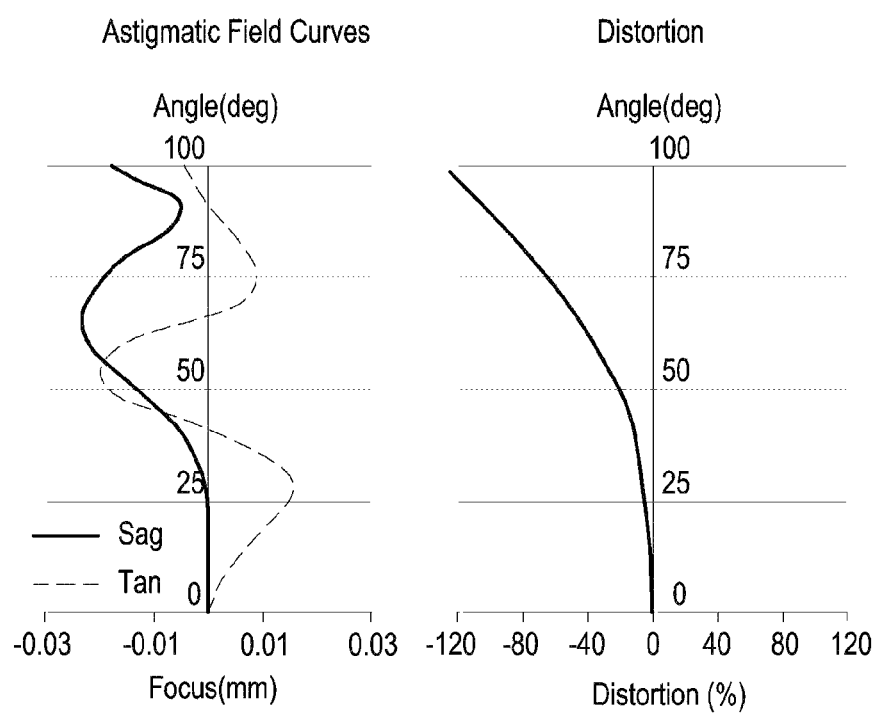
FIG. 5 are example aberration curves of an optical imaging system illustrated in FIG. 4.
Figure 6:
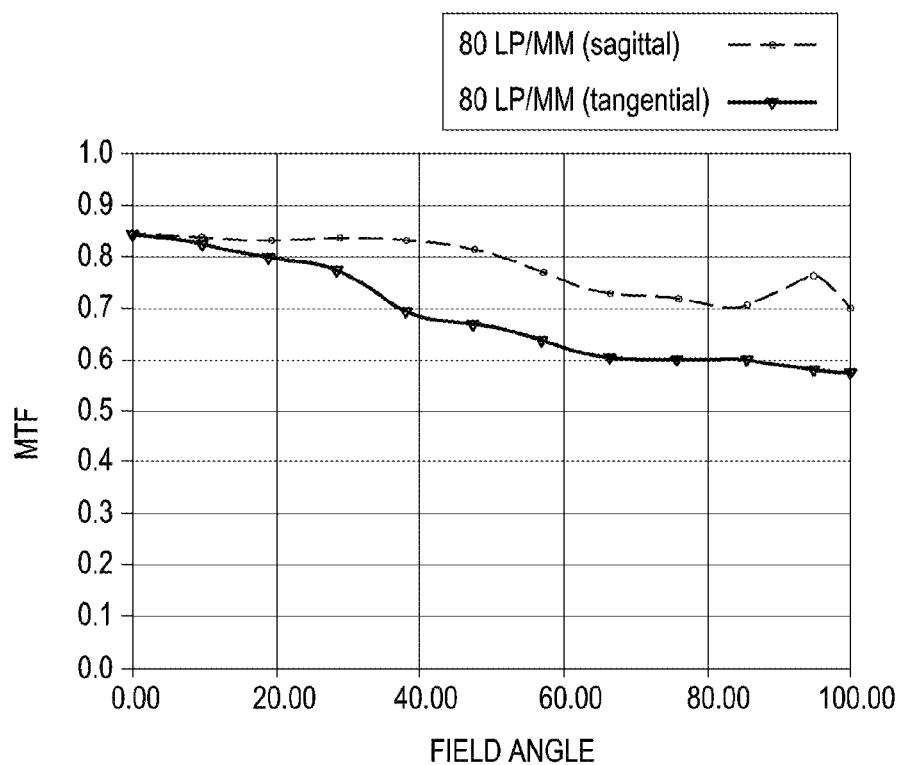
FIG. 6 are example MTF curves of an optical imaging system illustrated in FIG. 4 depending on temperature change.

Table 3 lists characteristics of the lenses, and Table 4 lists aspheric coefficients of the lenses. FIG. 5 shows example aberration curves of the optical imaging system, and FIG. 6 shows example MTF curves of the optical imaging system of the present example.

TABLE 3

| Surface No. | Note | Radius of Curvature | Thickness/ Distance | Refractive Index | Abbe No. | Focal Length |
|---|---|---|---|---|---|---|
| S1 | First | 14.120 | 0.622 | 1.7725 | 49.62 | −5.342 |
| S2 | Lens | 3.132 | 1.253 | | | |
| S3 | Second | 23.154 | 0.694 | 1.5311 | 55.91 | −4.538 |
| S4 | Lens | 2.160 | 0.698 | | | |
| S5 | Third | 3.684 | 2.800 | 1.6612 | 20.35 | 10.295 |
| S6 | Lens | 5.601 | 0.319 | | | |
| S7 | Stop | Infinity | 0.177 | | | |
| S8 | Fourth | 58.845 | 2.091 | 1.618 | 63.39 | 4.163 |
| S9 | Lens | −2.654 | 0.100 | | | |
| S10 | Fifth | 4.258 | 2.631 | 1.5348 | 55.71 | 3.341 |
| S11 | Lens | −2.417 | 0.043 | | | |
| S12 | Sixth | −2.399 | 1.368 | 1.6328 | 23.3 | −5.907 |
| S13 | Lens | −8.176 | 0.500 | | | |

TABLE 3-continued

| Surface No. | Note | Radius of Curvature | Thickness/ Distance | Refractive Index | Abbe No. | Focal Length |
|---|---|---|---|---|---|---|
| S14 | Filter | Infinity | 0.400 | 1.5168 | 64.17 | |
| S15 | | Infinity | 1.312 | | | |
| S16 | Imaging Plane | Infinity | −0.001 | | | |

TABLE 4

| Surface No. | K | A | B | C | D |
|---|---|---|---|---|---|
| S3 | 0 | 0.038077 | −0.00905 | 0.000906 | −3.5E−05 |
| S4 | 0 | 0.036319 | 0.007743 | −0.0113 | 0.002216 |
| S5 | 0 | 0.001981 | 0.007313 | −0.00387 | 0.000506 |
| S6 | 0 | 0.036503 | 0.005721 | — | — |
| S8 | 0 | 0.020138 | 0.000255 | — | — |
| S9 | 0 | 0.003421 | −0.00013 | −0.00081 | 0.000216 |
| S10 | 0 | 0.001956 | −0.00224 | 0.000458 | −8.1E−05 |
| S11 | 0 | −0.01927 | 0.020429 | −0.00499 | 0.000478 |
| S12 | 0 | −0.00859 | 0.014604 | −0.0039 | 0.000434 |
| S13 | 0 | 0.023554 | −0.0051 | 0.000495 | −2.2E−05 |

Figure 7:
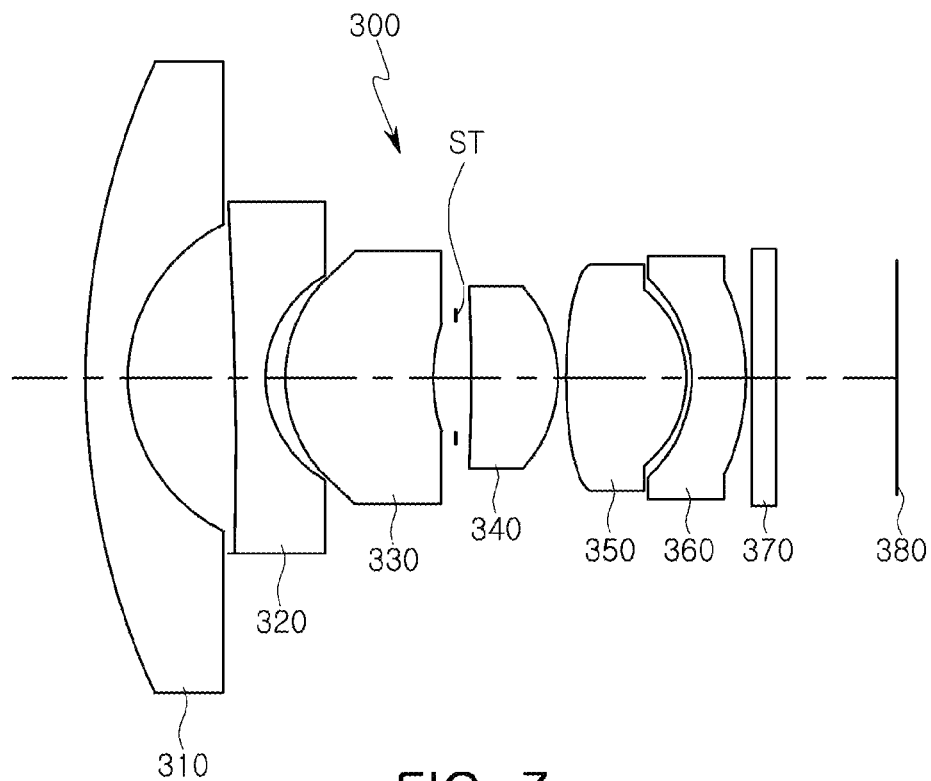
FIG. 7 is a diagram illustrating a third example of an optical imaging system.

A third example of an optical imaging system will be described with reference to FIG. 7.

The optical imaging system 300 may include a plurality of lenses having refractive power. The optical imaging system 300 may include a first lens 310, a second lens 320, a third lens 330, a fourth lens 340, a fifth lens 350, and a sixth lens 360.

The first lens 310 may have negative refractive power, and may have a convex object-side surface and a concave image-side surface. The second lens 320 may have negative refractive power, and may have a concave object-side surface and a concave image-side surface. The third lens 330 may have positive refractive power, and may have a convex object-side surface and a concave image-side surface. The fourth lens 340 may have positive refractive power, and may have a concave object-side surface and a convex image-side surface. The fifth lens 350 may have positive refractive power, and may have a convex object-side surface and a convex image-side surface. The sixth lens 360 may have negative refractive power, and may have a concave object-side surface and a convex image-side surface.

The optical imaging system 300 may include a plurality of aspherical lenses. The optical imaging system 300 may include a lens made of a glass material to exhibit constant optical performance even when temperature changes due to external conditions. In the present example, the first lens 310 and the fourth lens 340 may be made of a glass material, and the other lenses may be made of a plastic material.

The optical imaging system 300 may include a stop ST. The stop ST may be disposed between the third lens 330 and the fourth lens 340. The optical imaging system 300 may include a filter 370. The filter 370 may be disposed between the sixth lens 360 and an imaging plane 380. The filter 370 may block infrared light, and may prevent contamination of the imaging plane caused by foreign objects.

In the optical imaging system 300, TL is 14.01 mm, f is 1.224 mm, TL/f is 11.445, and Gf/f is 3.090, for example.

Figure 8:
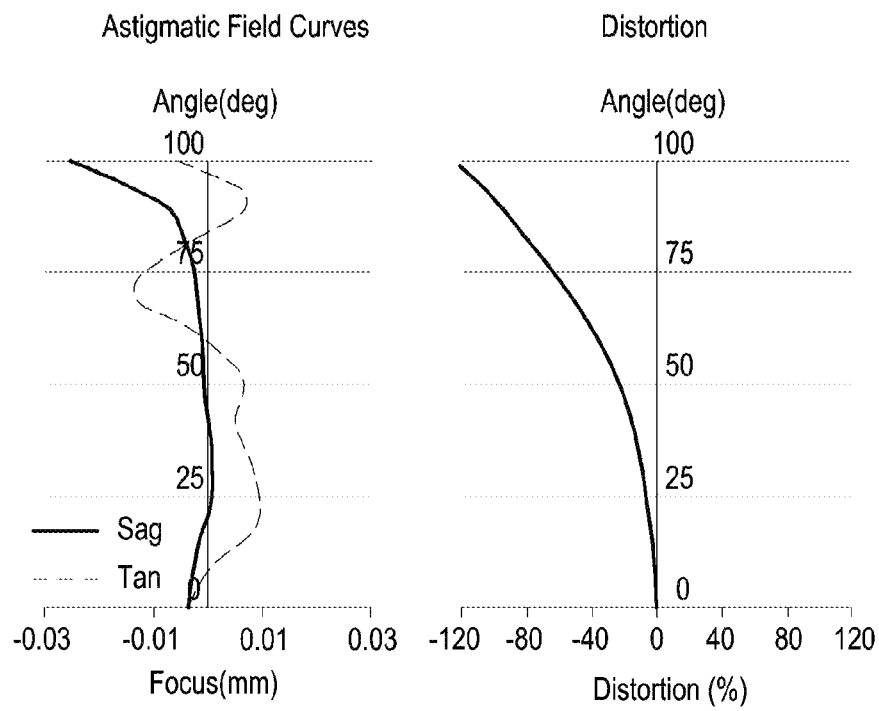
FIG. 8 are example aberration curves of an optical imaging system illustrated in FIG. 7.
Figure 9:
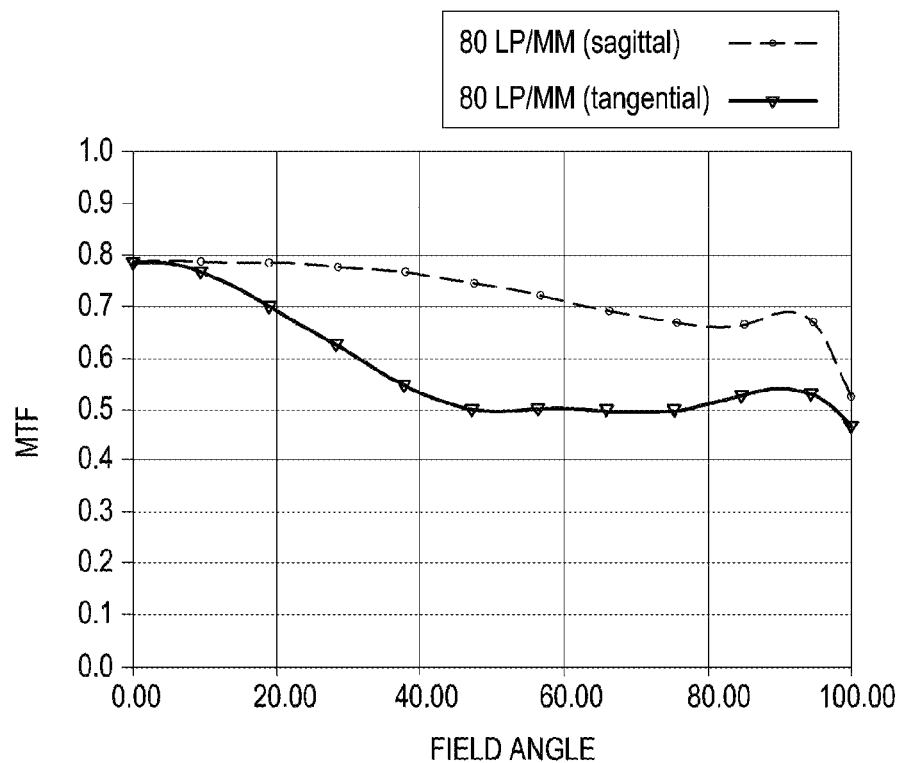
FIG. 9 are example MTF curves of an optical imaging system illustrated in FIG. 7 depending on temperature change.

Table 5 lists characteristics of the lenses, and Table 6 lists aspheric coefficients of the lenses. FIG. 8 shows example aberration curves of the optical imaging system, and FIG. 9 shows example MTF curves of the optical imaging system of the present example.

TABLE 5

| Surface No. | Note | Radius of Curvature | Thickness/ Distance | Refractive Index | Abbe No. | Focal Length |
|---|---|---|---|---|---|---|
| S1 | First | 13.238 | 0.697 | 1.7725 | 49.62 | −5.028 |
| S2 | Lens | 2.934 | 1.903 | | | |
| S3 | Second | −9.241 | 0.500 | 1.5348 | 55.71 | −3.646 |
| S4 | Lens | 2.518 | 0.334 | | | |
| S5 | Third | 3.128 | 2.577 | 1.6612 | 20.35 | 9.97 |
| S6 | Lens | 4.000 | 0.606 | | | |
| S7 | Stop | Infinity | 0.032 | | | |
| S8 | Fourth | −8.552 | 1.523 | 1.7725 | 49.62 | 3.783 |
| S9 | Lens | −2.347 | 0.100 | | | |
| S10 | Fifth | 5.745 | 2.088 | 1.5311 | 55.91 | 2.885 |
| S11 | Lens | −1.826 | 0.113 | | | |
| S12 | Sixth | −1.761 | 0.927 | 1.6612 | 20.35 | −10.492 |
| S13 | Lens | −2.854 | 0.100 | | | |
| S14 | Filter | Infinity | 0.400 | 1.5168 | 64.17 | |
| S15 | | Infinity | 2.105 | | | |
| S16 | Imaging Plane | Infinity | 0.004 | | | |

TABLE 6

| Surface No. | K | A | B | C | D | E |
|---|---|---|---|---|---|---|
| S3 | 0 | 0.022248 | −0.005073 | 0.000539 | −0.000022 | 0 |
| S4 | 0 | 0.015053 | 0.008656 | 0.008486 | −0.004581 | 0.000534 |
| S5 | 0 | 0.005118 | 0.016724 | −0.00187 | −0.000267 | 0 |
| S6 | 0 | 0.05904 | 0.027168 | 0 | 0 | 0 |
| S10 | 0 | −0.003894 | 0.003384 | −0.002718 | 0.000683 | 0 |
| S11 | 0 | −0.027791 | 0.049663 | −0.020176 | 0.00389 | 0 |
| S12 | 0 | −0.003688 | 0.051273 | −0.024811 | 0.005314 | 0 |
| S13 | 0 | 0.029963 | 0.001522 | −0.001976 | 0.000338 | 0 |

Figure 10:
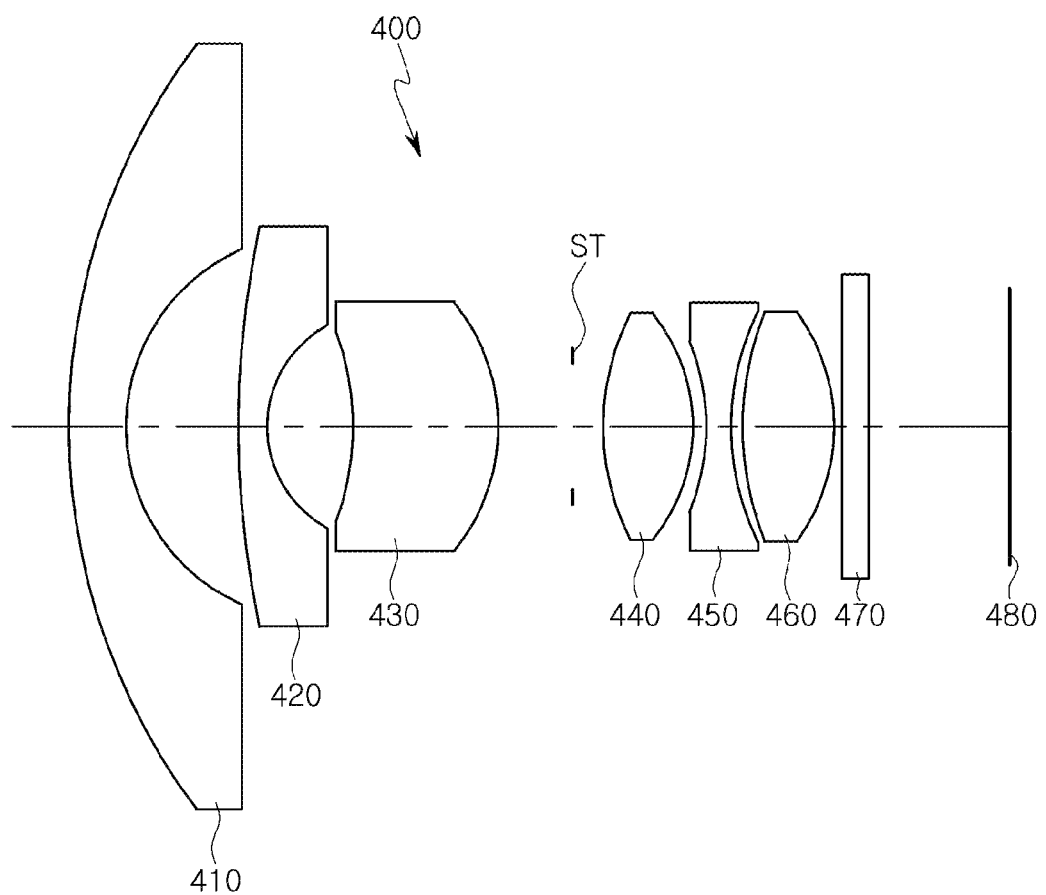
FIG. 10 is a diagram illustrating a fourth example of an optical imaging system.

A fourth example of an optical imaging system will be described with reference to FIG. 10.

The optical imaging system 400 may include a plurality of lenses having refractive power. The optical imaging system 400 may include a first lens 410, a second lens 420, a third lens 430, a fourth lens 440, a fifth lens 450, and a sixth lens 460.

The first lens 410 may have negative refractive power, and may have a convex object-side surface and a concave image-side surface. The second lens 420 may have negative refractive power, and may have a concave object-side surface and a concave image-side surface. The third lens 430 may have positive refractive power, and may have a concave object-side surface and a convex image-side surface. The fourth lens 440 may have positive refractive power, and may have a convex object-side surface and a convex image-side surface. The fifth lens 450 may have negative refractive power, and may have a concave object-side surface and a concave image-side surface. The sixth lens 460 may have positive refractive power, and may have a convex object-side surface and a convex image-side surface.

The optical imaging system 400 may include a plurality of aspherical lenses. The optical imaging system 400 may include a lens made of a glass material to exhibit constant optical performance even when temperature changes due to external conditions. In the present example, the first lens 410 and the fourth lens 440 may be made of a glass material, and the other lenses may be made of a plastic material.

The optical imaging system 400 may include a stop ST. The stop ST may be disposed between the third lens 430 and the fourth lens 440. The optical imaging system 400 may include a filter 470. The filter 470 may be disposed between the sixth lens 460 and an imaging plane 480. The filter 470 may block infrared light, and may prevent contamination of the imaging plane caused by foreign objects.

In the optical imaging system 400, TL is 14.00 mm, f is 1.169 mm, TL/f is 11.976, and Gf/f is 2.740, for example.

Figure 11:
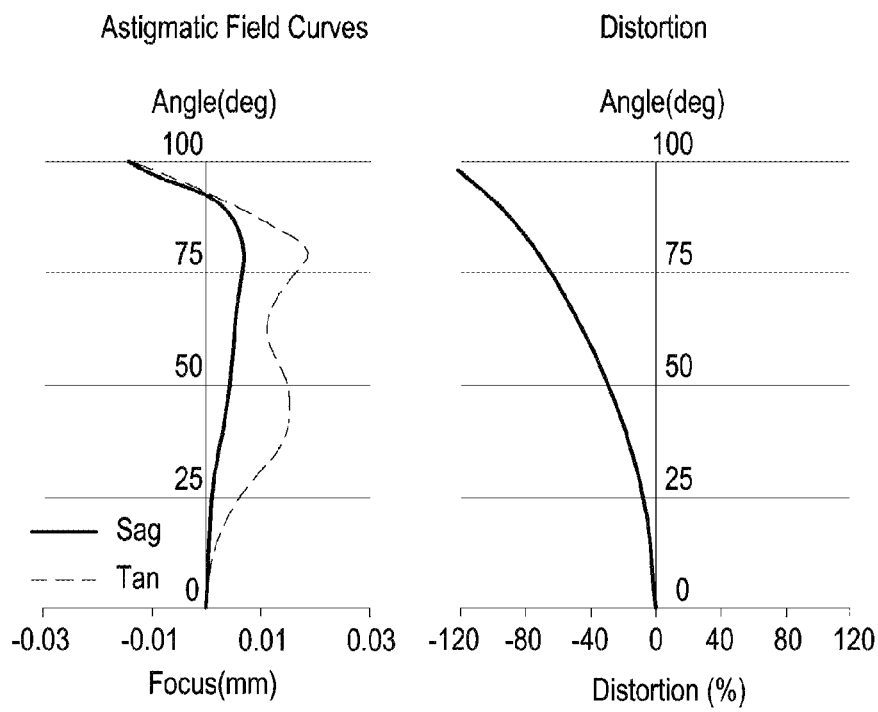
FIG. 11 are example aberration curves of an optical imaging system illustrated in FIG. 10.
Figure 12:
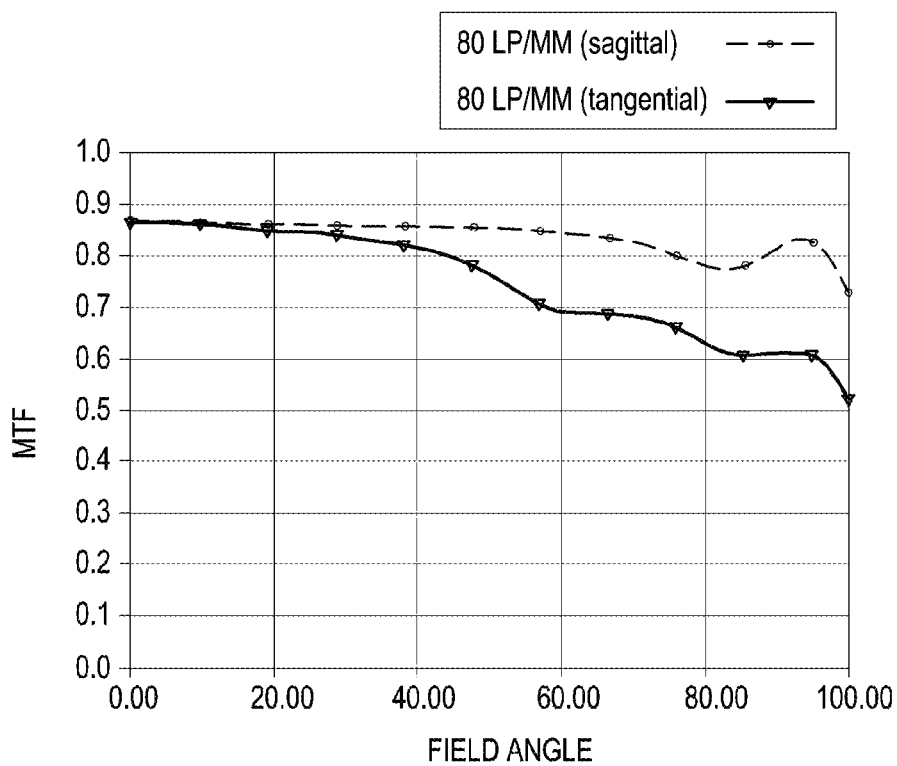
FIG. 12 are example MTF curves of an optical imaging system illustrated in FIG. 10 depending on temperature change.

Table 7 lists characteristics of the lenses, and Table 8 lists aspheric coefficients of the lenses. FIG. 11 shows example aberration curves of the optical imaging system, and FIG. 12 shows example MTF curves of the optical imaging system of the present example.

TABLE 7

| Surface No. | Note | Radius of Curvature | Thickness/ Distance | Refractive Index | Abbe No. | Focal Length |
|---|---|---|---|---|---|---|
| S1 | First | 9.605 | 0.853 | 1.7725 | 49.62 | −5.62 |
| S2 | Lens | 2.874 | 1.661 | | | |
| S3 | Second | −16.267 | 0.424 | 1.5348 | 55.71 | −3.176 |
| S4 | Lens | 1.914 | 1.271 | | | |
| S5 | Third | −8.071 | 2.200 | 1.6142 | 25.59 | 6.335 |
| S6 | Lens | −2.897 | 1.100 | | | |
| S7 | Stop | Infinity | 0.458 | | | |
| S8 | Fourth | 3.808 | 1.310 | 1.5286 | 76.97 | 3.204 |
| S9 | Lens | −2.686 | 0.202 | | | |
| S10 | Fifth | −5.319 | 0.400 | 1.6612 | 20.35 | −2.903 |
| S11 | Lens | 3.092 | 0.158 | | | |
| S12 | Sixth | 2.786 | 1.363 | 1.5348 | 55.71 | 3.135 |
| S13 | Lens | −3.492 | 0.100 | | | |
| S14 | Filter | Infinity | 0.400 | 1.5168 | 64.17 | |
| S15 | | Infinity | 2.102 | | | |
| S16 | Imaging Plane | Infinity | −0.002 | | | |

TABLE 8

| Surface No. | K | A | B | C | D |
|---|---|---|---|---|---|
| S3 | 0 | 0.022057 | −0.00332 | 0.000293 | −0.000012 |
| S4 | 0 | 0.021159 | 0.007749 | −0.00158 | 0.000498 |
| S5 | 0 | −0.023916 | 0.004073 | −0.002305 | 0.000397 |
| S6 | 0 | −0.001319 | 0.000823 | 0 | 0 |
| S10 | 0 | −0.005284 | −0.01539 | 0.002147 | −0.00012 |
| S11 | 0 | −0.023519 | 0.005969 | −0.001652 | 0.000086 |
| S12 | 0 | −0.062308 | 0.016333 | −0.002216 | 0 |
| S13 | 0 | −0.017908 | −0.000703 | 0.000752 | −0.000063 |

Figure 13:
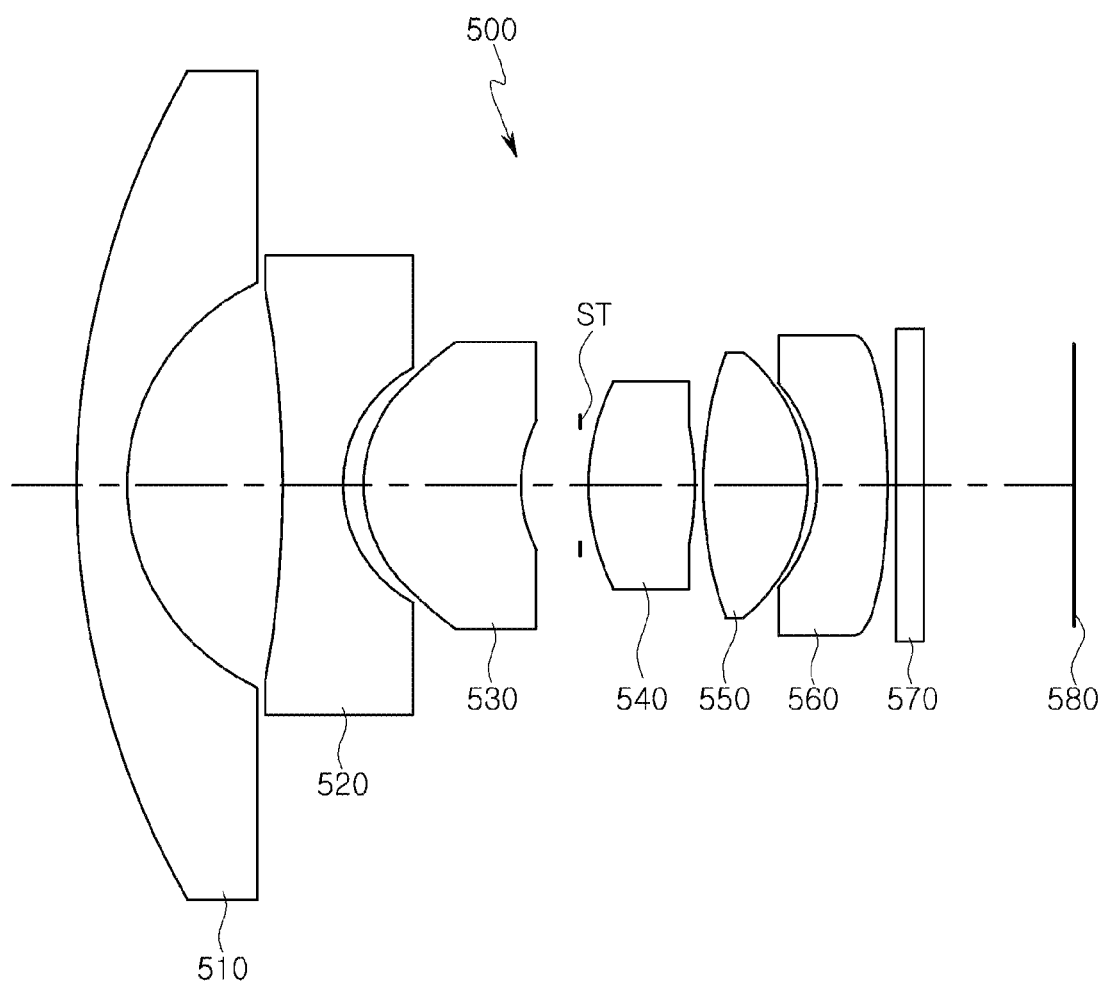
FIG. 13 is a diagram illustrating a fifth example of an optical imaging system.

A fifth example of an optical imaging system will be described with reference to FIG. 13.

The optical imaging system 500 may include a plurality of lenses having refractive power. The optical imaging system 500 may include a first lens 510, a second lens 520, a third lens 530, a fourth lens 540, a fifth lens 550, and a sixth lens 560.

The first lens 510 may have negative refractive power, and may have a convex object-side surface and a concave image-side surface. The second lens 520 may have negative refractive power, and may have a concave object-side surface and a concave image-side surface. The third lens 530 may have positive refractive power, and may have a convex object-side surface and a concave image-side surface. The fourth lens 540 may have positive refractive power, and may have a convex object-side surface and a convex image-side surface. The fifth lens 550 may have positive refractive power, and may have a convex object-side surface and a convex image-side surface. The sixth lens 560 may have negative refractive power, and may have a concave object-side surface and a convex image-side surface.

The optical imaging system 500 may include a plurality of aspherical lenses. The optical imaging system 500 may include a lens made of a glass material to exhibit constant optical performance even when temperature changes due to external conditions. In the present example, the first lens 510 and the fifth lens 550 may be made of a glass material, and the other lenses may be made of a plastic material.

The optical imaging system 500 may include a stop ST. The stop ST may be disposed between the third lens 530 and the fourth lens 540. The optical imaging system 500 may include a filter 570. The filter 570 may be disposed between the sixth lens 560 and an imaging plane 580. The filter 570 may block infrared light, and may prevent contamination of the imaging plane caused by foreign objects.

In the optical imaging system 500, TL is 14.00 mm, f is 1.208 mm, TL/f is 11.591, and Gf/f is 1.917, for example.

Figure 14:
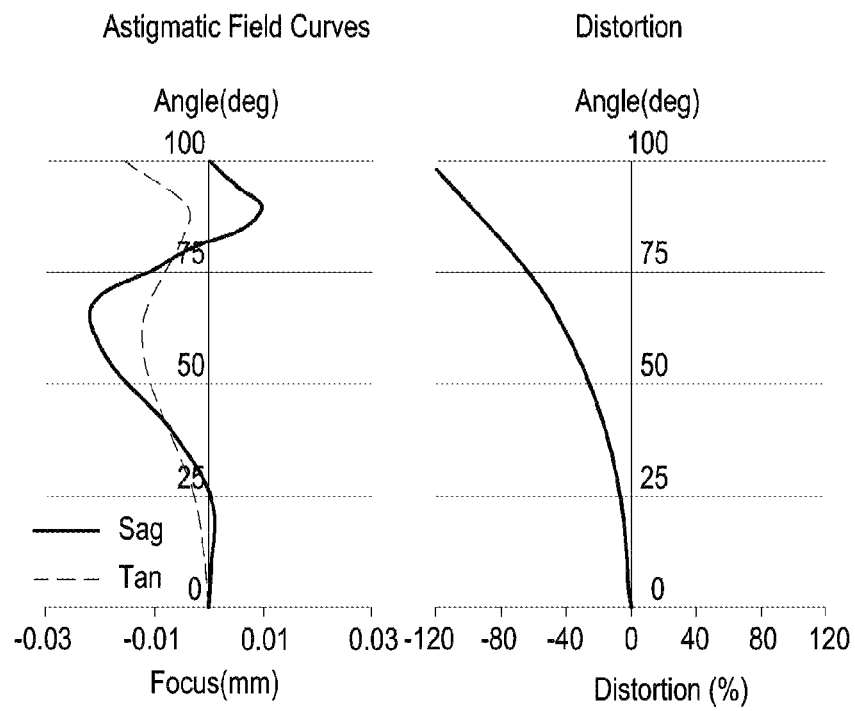
FIG. 14 are example aberration curves of an optical imaging system illustrated in FIG. 13.
Figure 15:
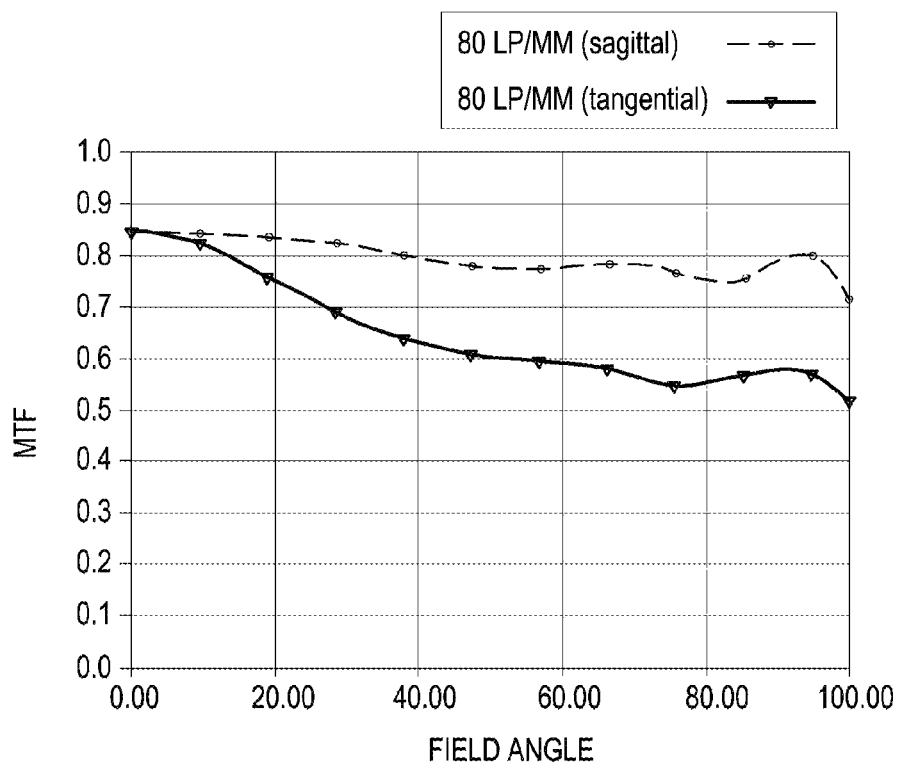
FIG. 15 are example MTF curves of an optical imaging system illustrated in FIG. 13 depending on temperature change.

Table 9 lists characteristics of the lenses, and Table 10 lists aspheric coefficients of the lenses. FIG. 14 shows example aberration curves of the optical imaging system, and FIG. 15 shows example MTF curves of the optical imaging system of the present example.

TABLE 9

| Surface No. | Note | Radius of Curvature | Thickness/ Distance | Refractive Index | Abbe No. | Focal Length |
|---|---|---|---|---|---|---|
| S1 | First | 11.400 | 0.758 | 1.7725 | 49.62 | −5.799 |
| S2 | Lens | 3.123 | 2.154 | | | |
| S3 | Second | −8.038 | 0.840 | 1.5348 | 55.71 | −3.032 |
| S4 | Lens | 2.105 | 0.295 | | | |
| S5 | Third | 2.924 | 2.200 | 1.6612 | 20.35 | 9.133 |
| S6 | Lens | 3.972 | 0.841 | | | |
| S7 | Stop | Infinity | 0.102 | | | |
| S8 | Fourth | 5.050 | 1.500 | 1.5348 | 55.71 | 4.494 |
| S9 | Lens | −4.111 | 0.100 | | | |
| S10 | Fifth | 5.503 | 1.486 | 1.7725 | 49.62 | 2.316 |
| S11 | Lens | −2.338 | 0.121 | | | |
| S12 | Sixth | −1.996 | 1.000 | 1.6612 | 20.35 | −6.937 |
| S13 | Lens | −4.237 | 0.100 | | | |
| S14 | Filter | Infinity | 0.400 | 1.5168 | 64.17 | |
| S15 | | Infinity | 2.105 | | | |
| S16 | Imaging Plane | Infinity | 0.000 | | | |

TABLE 10

| Surface No. | K | A | B | C | D |
|---|---|---|---|---|---|
| S3 | 0 | 0.007072 | −0.000479 | 0.00001 | 0 |
| S4 | 0 | 0.028431 | 0.003074 | 0.001761 | −0.001496 |
| S5 | 0 | 0.041547 | 0.001255 | 0.00032 | −0.000336 |
| S6 | 0 | 0.090281 | 0.014834 | 0 | 0 |
| S8 | 0 | 0.050162 | 0.008309 | −0.007891 | 0 |
| S9 | 0 | 0.024197 | 0.015536 | −0.00749 | 0.004248 |
| S12 | 0 | 0.033415 | −0.006158 | −0.002173 | 0.000603 |
| S13 | 0 | 0.036963 | −0.005087 | −0.001664 | 0.000279 |

Figure 16:
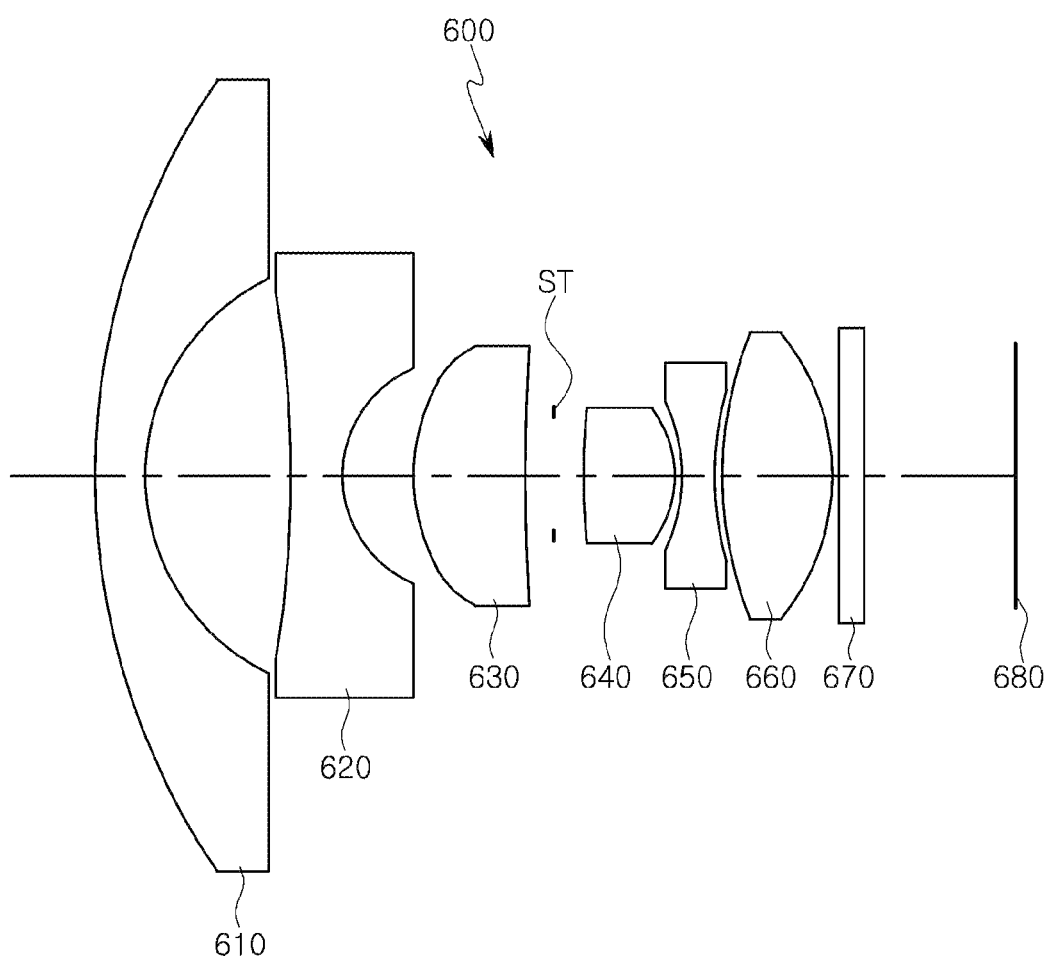
FIG. 16 is a diagram illustrating a sixth example of an optical imaging system.

A sixth example of an optical imaging system will be described with reference to FIG. 16.

The optical imaging system 600 may include a plurality of lenses having refractive power. The optical imaging system 600 may include a first lens 610, a second lens 620, a third lens 630, a fourth lens 640, a fifth lens 650, and a sixth lens 660.

The first lens 610 may have negative refractive power, and may have a convex object-side surface and a concave image-side surface. The second lens 620 may have negative refractive power, and may have a concave object-side surface and a concave image-side surface. The third lens 630 may have positive refractive power, and may have a convex object-side surface and a convex image-side surface. The fourth lens 640 may have positive refractive power, and may have a convex object-side surface and a convex image-side surface. The fifth lens 650 may have negative refractive power, and may have a concave object-side surface and a concave image-side surface. The sixth lens 660 may have positive refractive power, and may have a convex object-side surface and a convex image-side surface.

The optical imaging system 600 may include a plurality of aspherical lenses. The optical imaging system 600 may include a lens made of a glass material to exhibit constant optical performance even when temperature changes due to external conditions. In the present example, the first lens 610 and the sixth lens 660 may be made of a glass material, and the other lenses may be made of a plastic material.

The optical imaging system 600 may include a stop ST. The stop ST may be disposed between the third lens 630 and the fourth lens 640. The optical imaging system 600 may include a filter 670. The filter 670 may be disposed between the sixth lens 660 and an imaging plane 680. The filter 670 may block infrared light, and may prevent contamination of the imaging plane caused by foreign objects.

In the optical imaging system 600, TL is 14.00 mm, f is 1.173 mm, TL/f is 11.938, and Gf/f is 2.638, for example.

Figure 17:
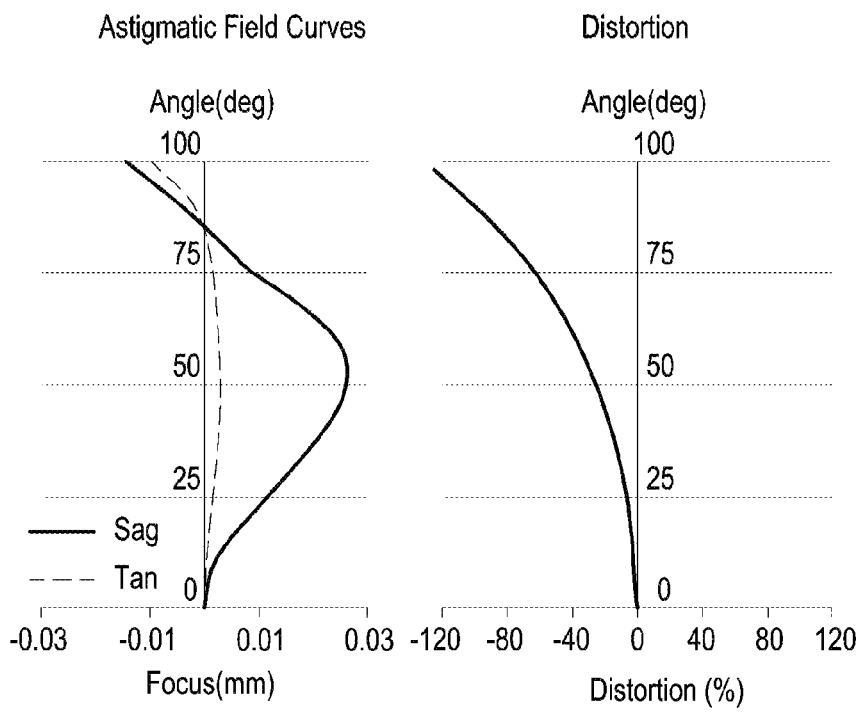
FIG. 17 are example aberration curves of an optical imaging system illustrated in FIG. 16.
Figure 18:
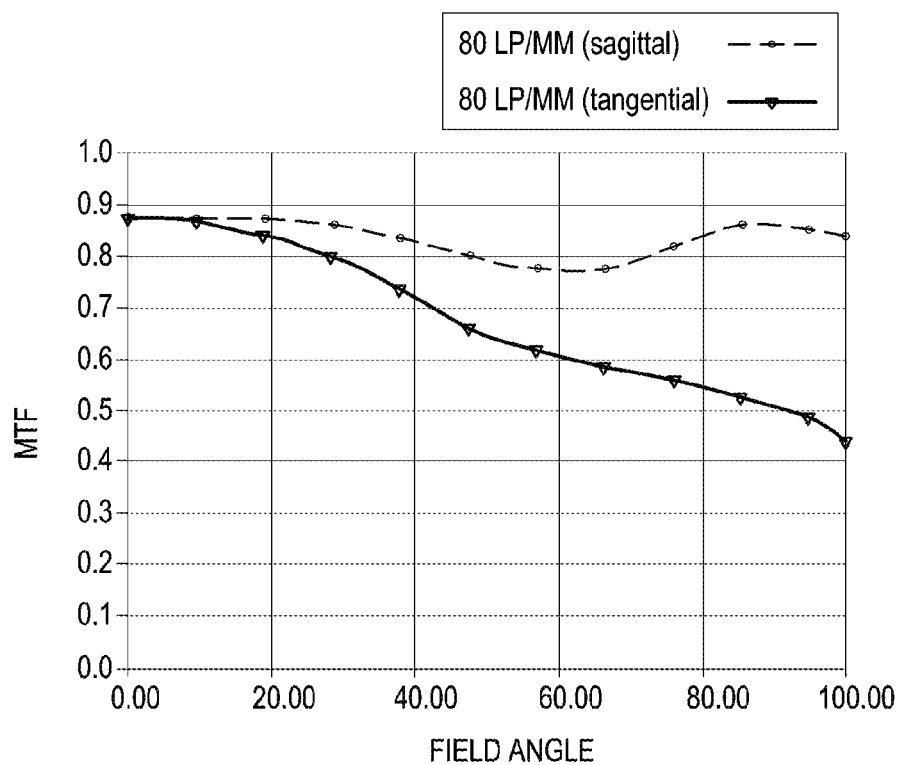
FIG. 18 are example MTF curves of an optical imaging system illustrated in FIG. 16 depending on temperature change.

Table 11 lists characteristics of the lenses, and Table 12 lists aspheric coefficients of the lenses. FIG. 17 shows example aberration curves of the optical imaging system, and FIG. 18 shows example MTF curves of the optical imaging system of the present example.

TABLE 11

| Surface No. | Note | Radius of Curvature | Thickness/ Distance | Refractive Index | Abbe No. | Focal Length |
|---|---|---|---|---|---|---|
| S1 | First | 10.698 | 0.750 | 1.7725 | 49.62 | −6.444 |
| S2 | Lens | 3.293 | 2.243 | | | |
| S3 | Second | −6.743 | 0.778 | 1.5348 | 55.71 | −2.673 |
| S4 | Lens | 1.887 | 1.078 | | | |
| S5 | Third | 4.235 | 1.726 | 1.6612 | 20.35 | 5.5 |
| S6 | Lens | −21.574 | 0.847 | | | |
| S7 | Stop | Infinity | 0.000 | | | |
| S8 | Fourth | 6.955 | 1.417 | 1.5348 | 55.71 | 2.446 |
| S9 | Lens | −1.497 | 0.100 | | | |
| S10 | Fifth | −2.466 | 0.500 | 1.6612 | 20.35 | −2.798 |
| S11 | Lens | 8.001 | 0.100 | | | |
| S12 | Sixth | 5.972 | 1.653 | 1.7725 | 49.62 | 3.095 |
| S13 | Lens | −3.506 | 0.100 | | | |
| S14 | Filter | Infinity | 0.400 | 1.5168 | 64.17 | |
| S15 | | Infinity | 2.312 | | | |
| S16 | Imaging Plane | Infinity | −0.001 | | | |

TABLE 12

| Surface No. | K | A | B | C | D |
|---|---|---|---|---|---|
| S3 | 0 | 0.015434 | −0.002116 | 0.00015 | −0.000004 |
| S4 | 0 | 0.012125 | 0.003874 | 0.002595 | −0.000985 |
| S5 | 0 | 0.010111 | 0.008928 | −0.001295 | 0.000102 |
| S6 | 0 | 0.027193 | 0.005965 | 0 | 0 |
| S8 | 0 | 0.001671 | −0.03033 | 0.027011 | −0.034769 |
| S9 | 0 | 0.084583 | −0.077767 | 0.041918 | −0.011029 |
| S10 | 0 | 0.06687 | −0.074507 | 0.030336 | −0.006024 |
| S11 | 0 | 0.031499 | −0.011608 | 0.003965 | −0.00062 |

Figure 19:
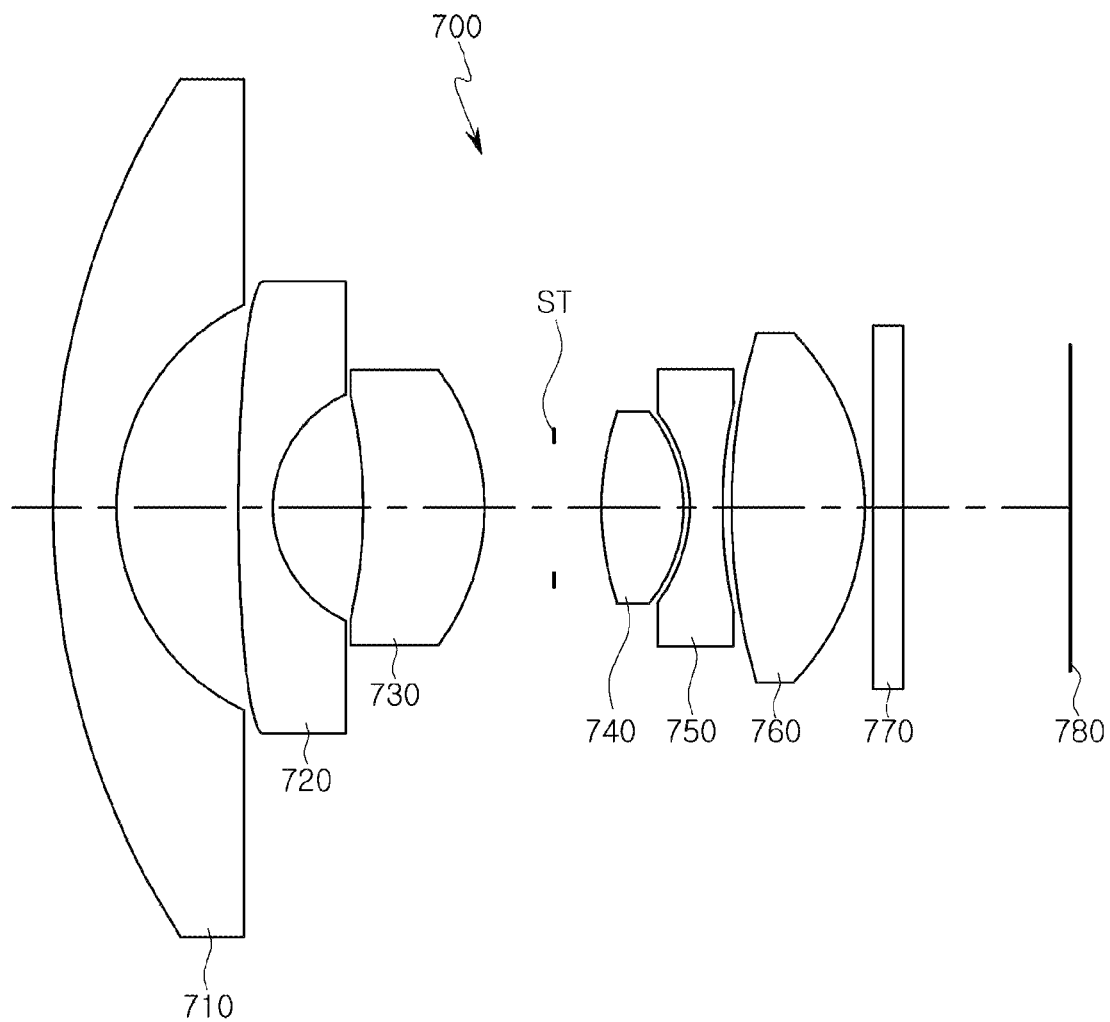
FIG. 19 is a diagram illustrating a seventh example of an optical imaging system.

A seventh example of an optical imaging system will be described with reference to FIG. 19.

The optical imaging system 700 may include a plurality of lenses having refractive power. The optical imaging system 700 may include a first lens 710, a second lens 720, a third lens 730, a fourth lens 740, a fifth lens 750, and a sixth lens 760.

The first lens 710 may have negative refractive power, and may have a convex object-side surface and a concave image-side surface. The second lens 720 may have negative refractive power, and may have a concave object-side surface and a concave image-side surface. The third lens 730 may have positive refractive power, and may have a concave object-side surface and a convex image-side surface. The fourth lens 740 may have positive refractive power, and may have a convex object-side surface and a convex image-side surface. The fifth lens 750 may have negative refractive power, and may have a concave object-side surface and a concave image-side surface. The sixth lens 760 may have positive refractive power, and may have a convex object-side surface and a convex image-side surface.

The optical imaging system 700 may include a plurality of aspherical lenses. The optical imaging system 700 may include a lens made of a glass material to exhibit constant optical performance even when temperature changes due to external conditions. In the exemplary embodiment, the first lens 710 and the sixth lens 760 may be made of a glass material, and the other lenses may be made of a plastic material.

The optical imaging system 700 may include a stop ST. The stop ST may be disposed between the third lens 730 and the fourth lens 740. The optical imaging system 700 may include a filter 770. The filter 770 may be disposed between the sixth lens 760 and an imaging plane 780. The filter 770 may block infrared light, and may prevent contamination of the imaging plane caused by foreign objects.

In the optical imaging system 700, TL is 12.94 mm, f is 1.149 mm, TL/f is 11.265, and Gf/f is 2.847, for example.

Figure 20:
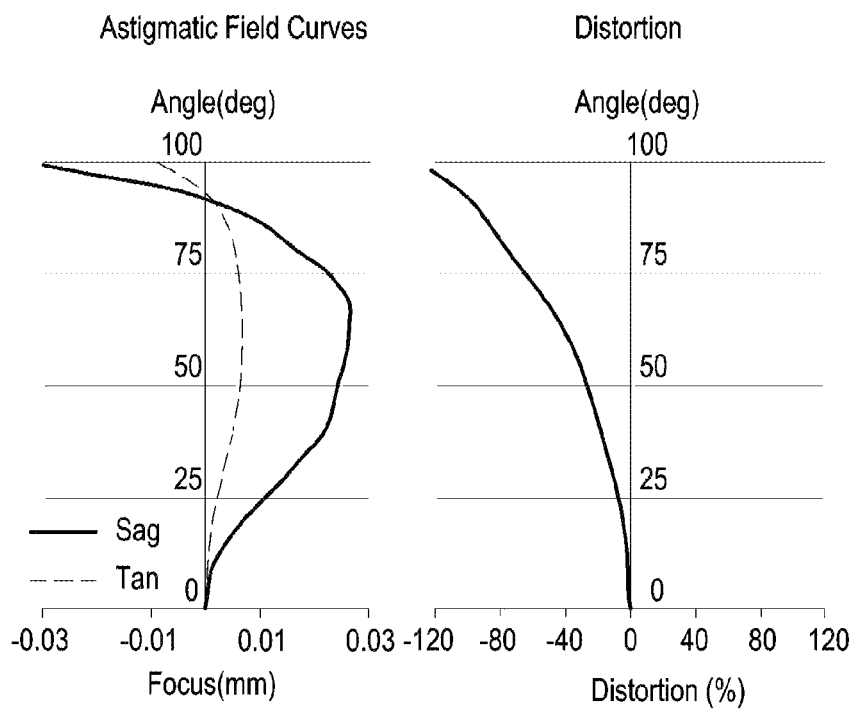
FIG. 20 are example aberration curves of an optical imaging system illustrated in FIG. 19.
Figure 21:
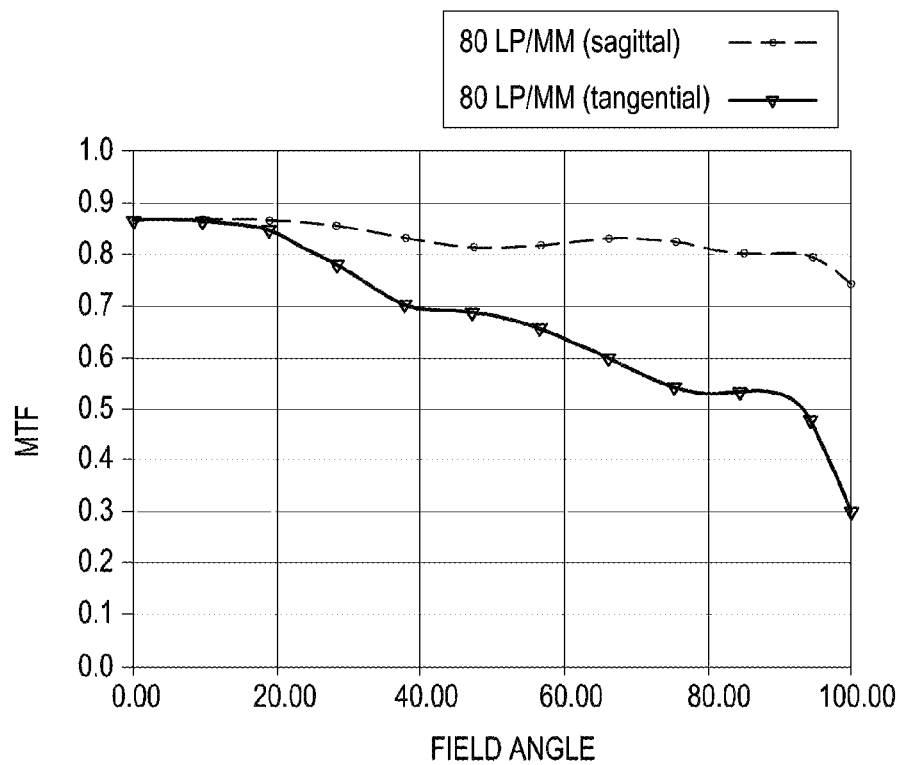
FIG. 21 are example MTF curves of an optical imaging system illustrated in FIG. 19 depending on temperature change.

Table 13 lists characteristics of the lenses, and Table 14 lists aspheric coefficients of the lenses. FIG. 20 shows example aberration curves of the optical imaging system, and FIG. 21 shows example MTF curves of the optical imaging system of the present example.

TABLE 13

| Surface No. | Note | Radius of Curvature | Thickness/ Distance | Refractive Index | Abbe No. | Focal Length |
|---|---|---|---|---|---|---|
| S1 | First | 9.791 | 0.796 | 1.7725 | 49.62 | −5.459 |
| S2 | Lens | 2.843 | 1.579 | | | |
| S3 | Second | −36.789 | 0.442 | 1.5348 | 55.71 | −2.997 |
| S4 | Lens | 1.683 | 1.153 | | | |
| S5 | Third | −14.346 | 1.549 | 1.6612 | 20.35 | 5.408 |
| S6 | Lens | −2.985 | 0.868 | | | |
| S7 | Stop | Infinity | 0.611 | | | |
| S8 | Fourth | 4.157 | 1.046 | 1.5348 | 55.71 | 2.261 |
| S9 | Lens | −1.556 | 0.100 | | | |
| S10 | Fifth | −1.730 | 0.400 | 1.6612 | 20.35 | −2.448 |
| S11 | Lens | 27.470 | 0.100 | | | |
| S12 | Sixth | 7.917 | 1.697 | 1.755 | 52.3 | 3.271 |
| S13 | Lens | −3.258 | 0.100 | | | |
| S14 | Filter | Infinity | 0.400 | 1.5168 | 64.17 | |
| S15 | | Infinity | 2.107 | | | |
| S16 | Imaging Plane | Infinity | −0.004 | | | |

TABLE 14

| Surface No. | K | A | B | C | D | E |
|---|---|---|---|---|---|---|
| S3 | 0 | 0.011535 | 0.000262 | −0.000324 | 0.000025 | 0 |
| S4 | 0 | 0.003551 | 0.016353 | −0.015941 | 0.014954 | −0.004295 |
| S5 | 0 | −0.024366 | 0.010204 | −0.004246 | 0.00024 | 0 |
| S6 | 0 | −0.000494 | −0.000707 | 0 | 0 | 0 |
| S8 | 0 | 0.030207 | −0.016653 | 0.005933 | −0.002546 | 0 |

TABLE 14-continued

| Surface No. | K | A | B | C | D | E |
|---|---|---|---|---|---|---|
| S9 | 0 | 0.097523 | −0.051311 | 0.016708 | 0.000351 | 0 |
| S10 | 0 | 0.059749 | −0.038996 | 0.011255 | 0.001721 | 0 |
| S11 | 0 | 0.023319 | 0.004766 | −0.000966 | −0.000139 | 0 |

Figure 22:
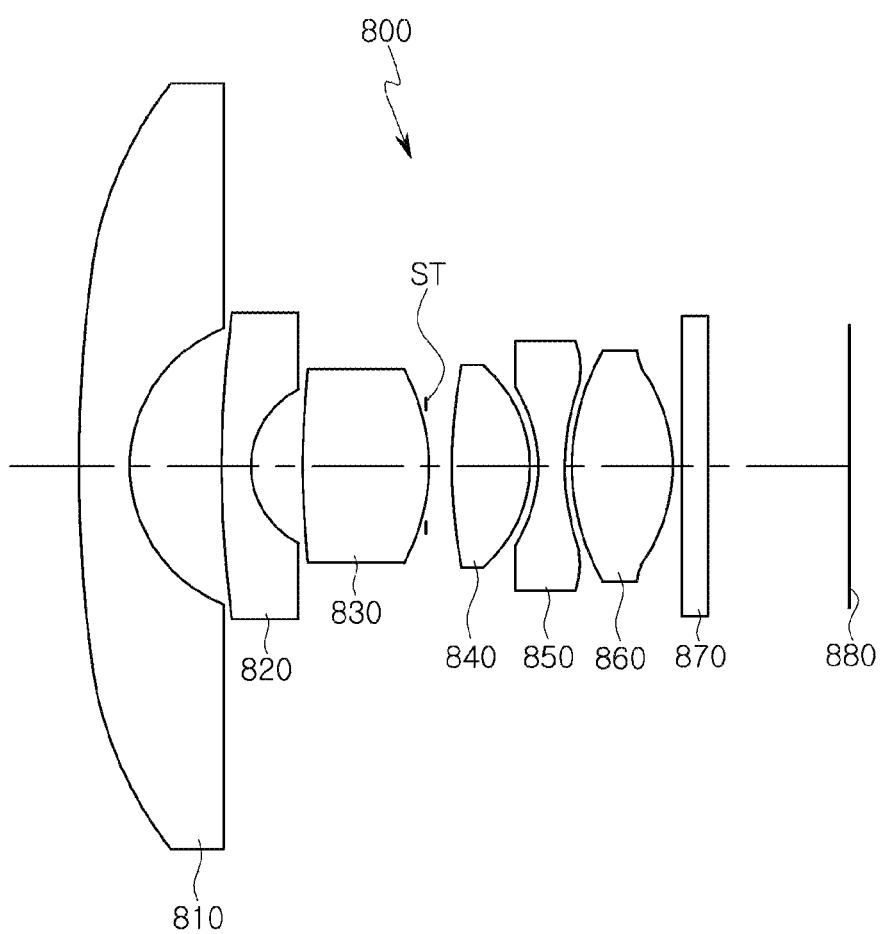
FIG. 22 is a diagram illustrating an eighth example of an optical imaging system.

An eighth example of an optical imaging system will be described with reference to FIG. 22.

The optical imaging system 800 may include a plurality of lenses having refractive power. The optical imaging system 800 may include a first lens 810, a second lens 820, a third lens 830, a fourth lens 840, a fifth lens 850, and a sixth lens 860.

The first lens 810 may have negative refractive power, and may have a convex object-side surface and a concave image-side surface. The second lens 820 may have negative refractive power, and may have a convex object-side surface and a concave image-side surface. The third lens 830 may have positive refractive power, and may have a convex object-side surface and a convex image-side surface. The fourth lens 840 may have positive refractive power, and may have a convex object-side surface and a convex image-side surface. The fifth lens 850 may have negative refractive power, and may have a concave object-side surface and a concave image-side surface. The sixth lens 860 may have positive refractive power, and may have a convex object-side surface and a convex image-side surface.

The optical imaging system 800 may include a plurality of aspherical lenses. The optical imaging system 800 may include a lens made of a glass material to exhibit constant optical performance even when temperature changes due to external conditions. In the present example, the fourth lens 840 may be made of a glass material, and the other lenses may be made of a plastic material.

The optical imaging system 800 may include a stop ST. The stop ST may be disposed between the third lens 830 and the fourth lens 840. The optical imaging system 800 may include a filter 870. The filter 870 may be disposed between the sixth lens 860 and an imaging plane 880. The filter 870 may block infrared light, and may prevent contamination of the imaging plane caused by foreign objects.

In the optical imaging system 800, TL is 11.36 mm, f is 1.193 mm, TL/f is 9.5239, and Gf/f is 2.240, for example.

Figure 23:
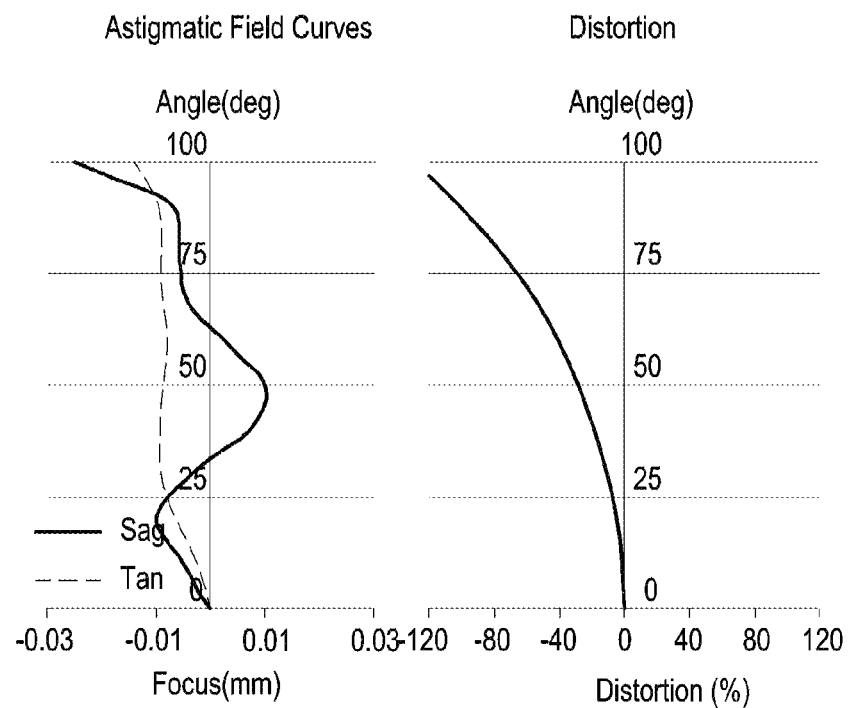
FIG. 23 are example aberration curves of an optical imaging system illustrated in FIG. 22.
Figure 24:
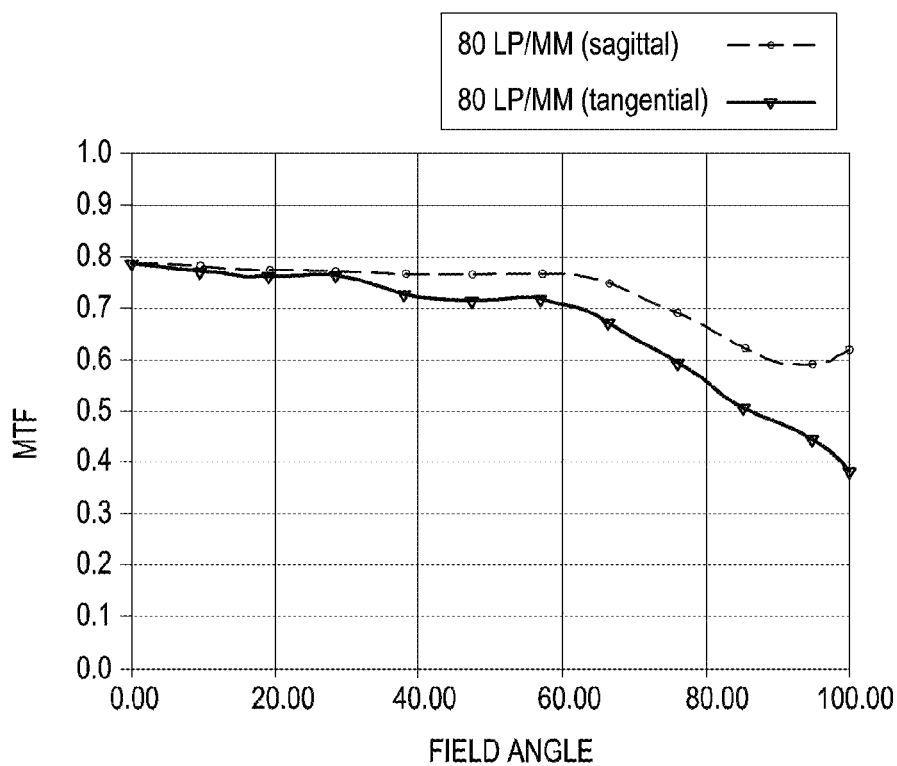
FIG. 24 are example MTF curves of an optical imaging system illustrated in FIG. 22 depending on temperature change.

Table 15 lists characteristics of the lenses, and Table 16 lists aspheric coefficients of the lenses. FIG. 23 shows example aberration curves of the optical imaging system, and FIG. 24 shows example MTF curves of the optical imaging system of the present example.

TABLE 15

| Surface No. | Note | Radius of Curvature | Thickness/ Distance | Refractive Index | Abbe No. | Focal Length |
|---|---|---|---|---|---|---|
| S1 | First | 52.275 | 0.750 | 1.5348 | 55.71 | −4.244 |
| S2 | Lens | 2.164 | 1.371 | | | |
| S3 | Second | 988.527 | 0.400 | 1.5348 | 55.71 | −3.009 |
| S4 | Lens | 1.606 | 0.784 | | | |
| S5 | Third | 43.204 | 1.872 | 1.6142 | 25.59 | 4.249 |
| S6 | Lens | −2.732 | −0.036 | | | |
| S7 | Stop | Infinity | 0.371 | | | |
| S8 | Fourth | 8.898 | 1.143 | 1.6201 | 63.48 | 2.672 |
| S9 | Lens | −1.936 | 0.100 | | | |
| S10 | Fifth | −4.045 | 0.400 | 1.6612 | 20.35 | −2.025 |
| S11 | Lens | 2.080 | 0.100 | | | |
| S12 | Sixth | 2.310 | 1.511 | 1.5441 | 56.09 | 2.424 |
| S13 | Lens | −2.364 | 0.100 | | | |

TABLE 15-continued

| Surface No. | Note | Radius of Curvature | Thickness/ Distance | Refractive Index | Abbe No. | Focal Length |
|---|---|---|---|---|---|---|
| S14 | Filter | Infinity | 0.400 | 1.5168 | 64.17 | |
| S15 | | Infinity | 2.094 | | | |
| S16 | Imaging Plane | Infinity | 0.002 | | | |

TABLE 16

| Surface No. | K | A | B | C | D |
|---|---|---|---|---|---|
| S1 | 0 | 0.001846 | −0.000044 | 0.000001 | 0 |
| S2 | 0 | −0.007644 | 0.003375 | −0.000765 | 0.000089 |
| S3 | 0 | 0.072528 | −0.037415 | 0.007633 | −0.000587 |
| S4 | 0 | 0.138667 | 0.035303 | −0.047267 | 0.027305 |
| S5 | 0 | 0.004146 | 0.003433 | −0.000514 | 0 |
| S6 | 0 | 0.004934 | −0.00666 | 0.004389 | 0 |
| S10 | 0 | −0.06457 | −0.016844 | 0.002349 | 0 |
| S11 | 0 | −0.093454 | 0.016541 | −0.004134 | 0.000061 |

In the optical imaging system, focal lengths of the first to fourth lenses may be determined within a certain range. For example, a focal length of the first lens may be determined within a range of −8.0 mm to −3.0 mm, a focal length of the second lens may be determined within a range of −6.0 mm to −1.0 mm, a focal length of the third lens may be determined within a range of 3.0 mm to 10.0 mm, and a focal length of the fourth lens may be determined within a range of 2.0 mm to 6.0 mm.

In the description below, one or more examples of a camera module will be described with reference to FIG. 25.

Figure 25:
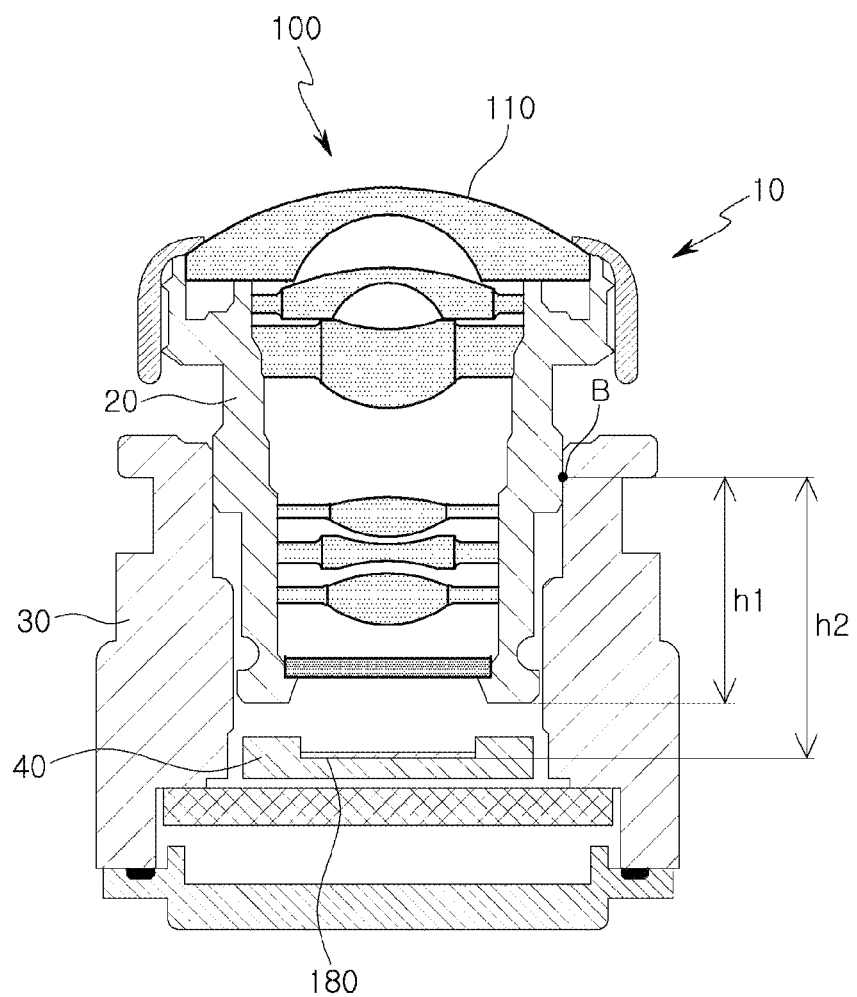
FIG. 25 is a cross-sectional diagram illustrating a camera module according to one or more examples.

A camera module 10 in the one or more examples may include one or more of the examples of the optical imaging system described above with reference to FIGS. 1-24 (FIG. 25 illustrates the first example of the optical imaging system). The camera module 10 may be configured such that constant level of optical performance of the optical imaging system may be maintained irrespective of temperature change. For example, the camera module 10 may include a lens barrel 20 and a housing 30 having different linear coefficients of thermal expansion. A linear coefficient of thermal expansion of the lens barrel 20 may be within a range of $2\times10^{-5}$ to $8\times10^{-5}$, and a linear coefficient of thermal expansion of the housing 30 may also be within a range of $2\times10^{-5}$ to $8\times10^{-5}$. A range of a linear coefficient of thermal expansion of the lens barrel and a range of a linear coefficient of thermal expansion of the housing may be the same in some examples, but in the camera module in the present example, the lens barrel and the housing may be configured to have different linear coefficients of thermal expansion.

The camera module 10 may be configured such that a lens unit and the imaging plane 180 (an image sensor) of the optical imaging system 100 may be disposed separately. For example, the lens unit of the optical imaging system 100 may be disposed in the lens barrel 20, and the imaging plane 180 may be disposed in the housing 30. The housing 30 may further include a substrate 40 to support the imaging plane 180.

A length of the lens barrel 20 may be determined in consideration of changes in back focus length (BFL) of the optical imaging system 100 depending on temperature change. For example, a length h1 from a bonding position B of the lens barrel 20 and the housing 30 to a lower end of the lens barrel 20 may be determined in consideration of the BFL of the optical imaging system 100, a linear coefficient of thermal expansion of the lens barrel 20, and the like. Alternatively, the length h1 from a bonding position B of the lens barrel 20 and the housing 30 to a lower end of the lens barrel 20 may be determined by a difference in linear coefficients of thermal expansion between the lens barrel 20 and the housing 30.

Similarly, the bonding position of the lens barrel 20 and the housing 30 may also be determined in consideration of changes in back focus length (BFL) of the optical imaging system 100 depending on temperature change. For example, a length h2 from the imaging plane 180 to the bonding position may be determined in consideration of the BFL of the optical imaging system 100 and a linear coefficient of thermal expansion of the lens barrel 20. Alternatively, the length h2 from the imaging plane 180 to the bonding position may be determined by a difference in linear coefficients of thermal expansion between the lens barrel 20 and the housing 30.

According to the aforementioned examples described herein, the optical imaging system exhibiting constant optical performance irrespective of changes in ambient temperature may be implemented.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
    a first lens, a second lens, a third lens, a fourth lens, a fifth lens, and a sixth lens sequentially disposed in ascending numerical order from an object side of the optical imaging system toward an imaging plane; and
    a stop disposed between the object side of the optical imaging system and the sixth lens,
    wherein one lens of the first to sixth lenses is made of a glass material and is disposed between the stop and the imaging plane,
    at least four lenses of the first to sixth lenses are made of a plastic material,
    the second lens has a concave object-side surface in an optical axis region thereof,
    the third lens has a concave object-side surface and a convex image-side surface in an optical axis region thereof, and
    the optical imaging system satisfies the following conditional expressions:

$Gf/f < 3.5$ where f is a focal length of the optical imaging system, and Gf is a focal length of the one lens made of a glass material and disposed between the stop and the imaging plane, and $$8.0 < TL/f < 14$$

where TL is a distance from an object-side surface of the first lens to the imaging plane.

2. The optical imaging system of claim 1, wherein the first lens has a negative refractive power.

3. The optical imaging system of claim 1, wherein the second lens has a negative refractive power.

4. The optical imaging system of claim 1, wherein the third lens has a positive refractive power.

5. The optical imaging system of claim 1, wherein the fourth lens has a positive refractive power.

6. The optical imaging system of claim 1, wherein an object-side surface of the fifth lens and an image-side surface of the fifth lens are both concave in an optical axis region thereof, or are both convex in an optical axis region thereof.

7. The optical imaging system of claim 1, wherein the first lens has a convex object-side surface in an optical axis region thereof.

8. The optical imaging system of claim 1, wherein the first lens has a concave image-side surface in an optical axis region thereof.

9. The optical imaging system of claim 1, wherein the fourth lens has a convex image-side surface in an optical axis region thereof.

10. The optical imaging system of claim 1, wherein the sixth lens has a convex image-side surface in an optical axis region thereof.

11. The optical imaging system of claim 1, wherein another lens of the first to sixth lenses is made of a glass material.

12. A camera module comprising:
a housing having a first linear coefficient of thermal expansion;
a lens barrel having a second linear coefficient of thermal expansion and disposed in the housing; and
the optical imaging system of claim 1,
wherein the first to sixth lenses and the stop are disposed in the lens barrel, and
the imaging plane is disposed in the housing.

13. The optical imaging system of claim 1, wherein the fourth lens has a convex object-side surface in an optical axis region thereof.

14. An optical imaging system comprising:
a first lens, a second lens, a third lens, a fourth lens, a fifth lens, and a sixth lens disposed in ascending numerical order from an object side of the optical imaging system toward an imaging plane; and
a stop disposed between the object side of the optical imaging system and the sixth lens,
wherein one lens of the first to sixth lenses has a positive refractive power, is made of a glass material, and is disposed between the stop and the imaging plane,
at least four lenses of the first to sixth lenses are made of a plastic material,
the second lens has a concave object-side surface in an optical axis region thereof,
the third lens has a concave object-side surface and a convex image-side surface in an optical axis region thereof, and
the optical imaging system satisfies the following conditional expressions:

$$Gf/f < 3.5$$

where f is a focal length of the optical imaging system, and Gf is a focal length of the one lens that has a positive refractive power, is made of a glass material, and is disposed between the stop and the imaging plane, and $$8.0 < TL/f < 14$$

where TL is a distance from an object-side surface of the first lens to the imaging plane.

15. The optical imaging system of claim 14, wherein the stop is disposed between the third lens and the fourth lens.

16. The optical imaging system of claim 14, wherein the fourth lens is the one lens that has a positive refractive power, is made of a glass material, and is disposed between the stop and the imaging plane.

17. The optical imaging system of claim 14, wherein the first lens is made of a glass material, and
the sixth lens is the one lens that has a positive refractive power, is made of a glass material, and is disposed between the stop and the imaging plane.

18. The optical imaging system of claim 14, wherein the second lens and the third lens are made of a plastic material.

19. A camera module comprising:
a housing having a first linear coefficient of thermal expansion, and comprising an imaging plane; and
a lens barrel having a second linear coefficient of thermal expansion disposed in the housing; and
an optical imaging system disposed in the lens barrel and configured to focus incident light on the imaging plane, the optical imaging system comprising:
a first lens, a second lens, a third lens, a fourth lens, a fifth lens, and a sixth lens disposed in ascending numerical order from an object side of the optical imaging system toward the imaging plane; and
a stop disposed between the object side of the optical imaging system and the sixth lens,
wherein one lens of the first to sixth lenses is made of a glass material and five lenses of the first to sixth lenses are made of a plastic material, or two lenses of the first to sixth lenses are made of a glass material and four lenses of the first to sixth lenses are made of a plastic material,
the one lens made of a glass material is disposed between the stop and the imaging plane, or one lens of the two lenses made of a glass material is disposed between the stop and the imaging plane,
the second lens has a concave object-side surface in an optical axis region thereof,
the third lens has a concave object-side surface and a convex image-side surface in an optical axis region thereof, and
the optical imaging system satisfies the following conditional expressions:

$$Gf/f < 3.5$$

where f is a focal length of the optical imaging system, and Gf is a focal length of the one lens made of a glass material and disposed between the stop and the imaging plane, or the one lens of the two lenses made of a glass material and disposed between the stop and the imaging plane, and $$8.0 < TL/f < 14$$

where TL is a distance from an object-side surface of the first lens to the imaging plane.

20. The camera module of claim 19, wherein the stop is disposed between the third lens and the fourth lens.

* * * * *